United States Patent
Tsuji

(10) Patent No.: US 6,259,811 B1
(45) Date of Patent: *Jul. 10, 2001

(54) IMAGE PROCESSING APPARATUS AND METHOD

(75) Inventor: Hiroyuki Tsuji, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/986,032

(22) Filed: Dec. 5, 1997

Related U.S. Application Data

(63) Continuation of application No. 08/413,431, filed on Mar. 30, 1995, now abandoned.

(30) Foreign Application Priority Data

Mar. 31, 1994 (JP) ........................................................ 6-62965

(51) Int. Cl.$^7$ ................................ G06K 9/00; H04N 1/46
(52) U.S. Cl. ........................ 382/166; 358/530; 358/518; 382/167; 382/232
(58) Field of Search .................................... 358/518, 500, 358/502, 530, 539, 501, 515, 520, 522, 523; 382/166, 167, 232

(56) References Cited

U.S. PATENT DOCUMENTS

| | | | | |
|---|---|---|---|---|
| 4,931,860 | * | 6/1990 | Narumiya | 358/75 |
| 5,268,753 | * | 12/1993 | Yamaguchi | 358/527 |
| 5,606,428 | * | 2/1997 | Hanselman | 358/404 |

FOREIGN PATENT DOCUMENTS

WO 92/06557    4/1992 (WO) .............................. H04N/1/46

* cited by examiner

*Primary Examiner*—Jerome Grant, II
(74) *Attorney, Agent, or Firm*—Fitzpatrick, Cella, Harper & Scinto

(57) ABSTRACT

An image processing apparatus is constructed by an input unit to input image data, a setting unit to set a color space compression processing mode on the basis of a kind of signal format of the inputted image data, and a color space compression processing unit to execute a color space compressing process to the inputted image data on the basis of the set color space compression processing mode. The color space compression processing mode has a first mode in which the color space compression is executed and a second mode in which the color space compression is not executed. In case of the CMYK signal format, the second mode is set. In case of the RGB signal format, the first mode is set.

13 Claims, 18 Drawing Sheets

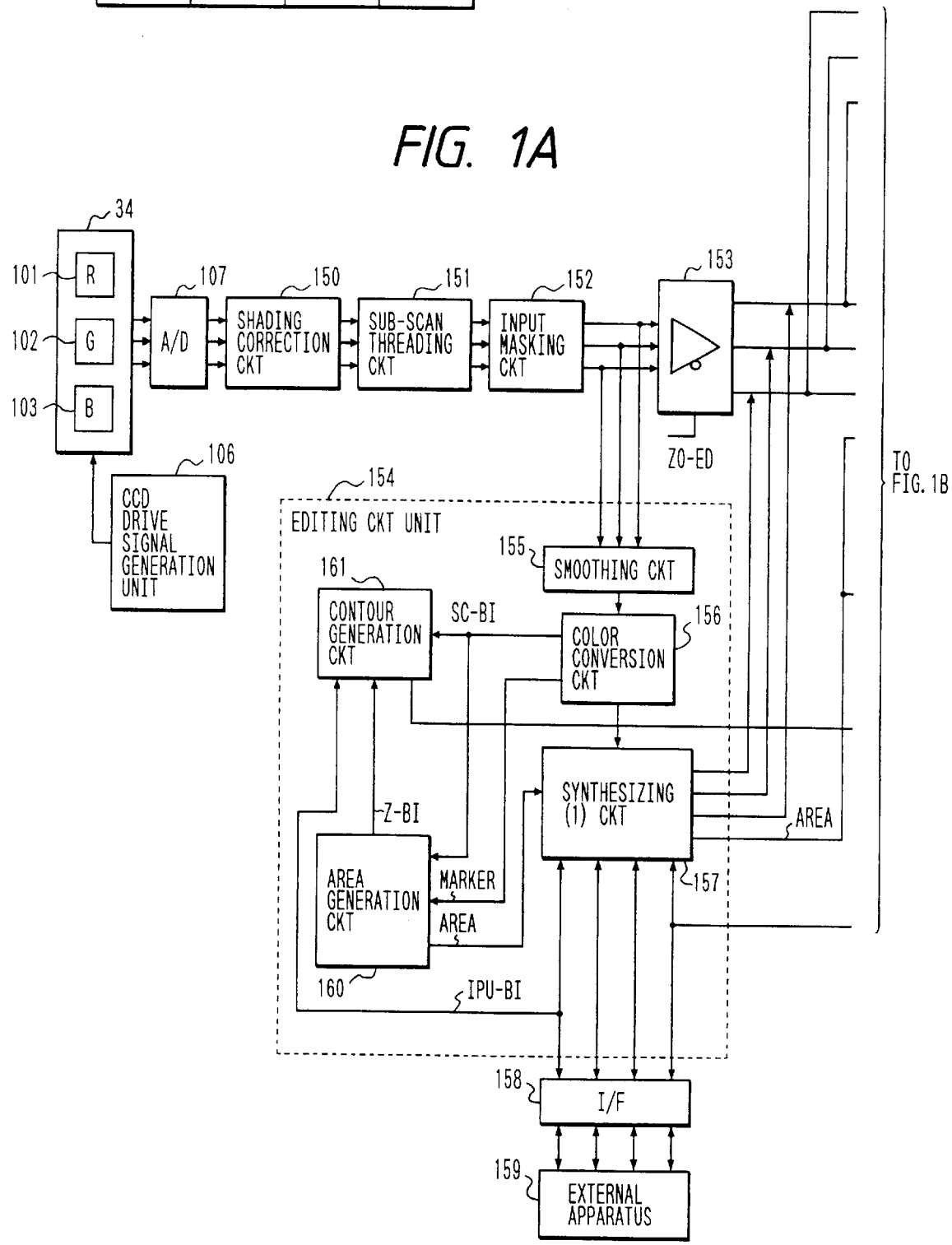

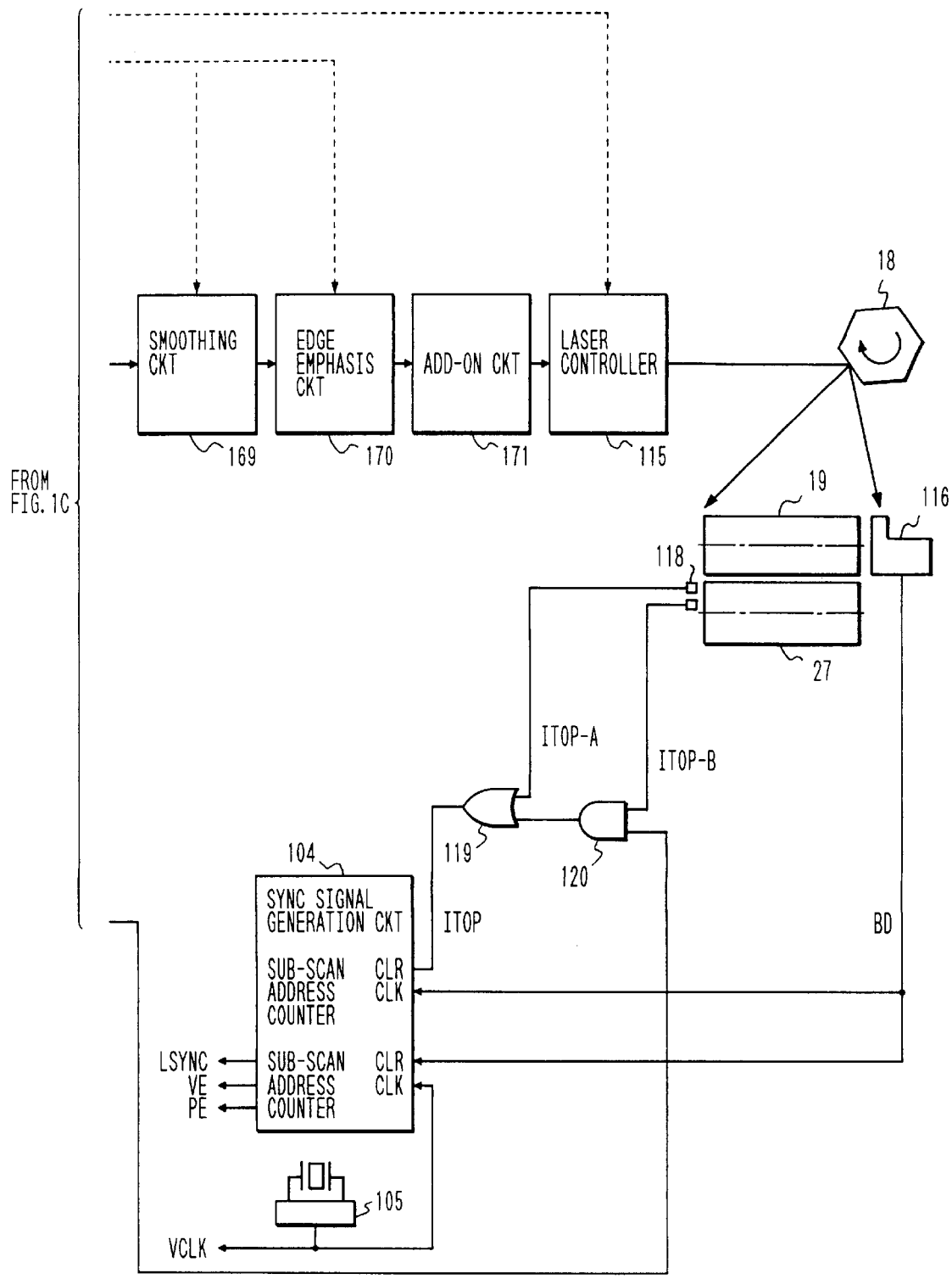

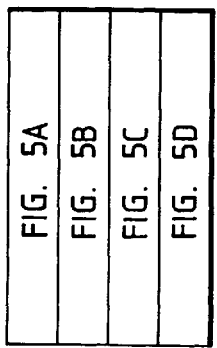
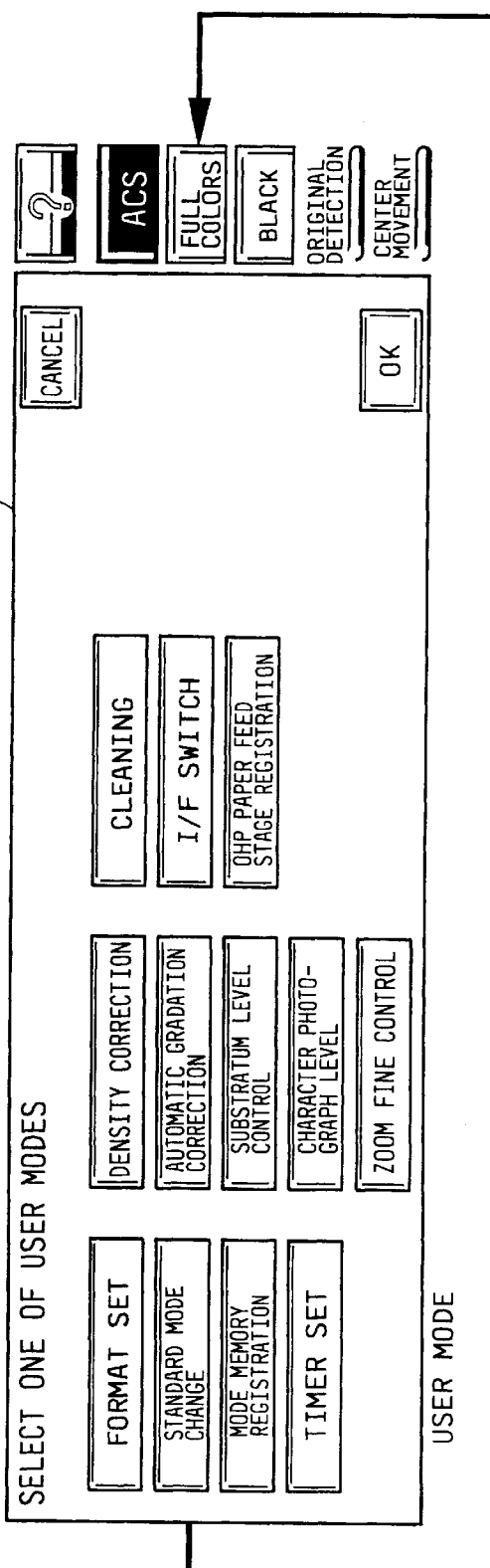

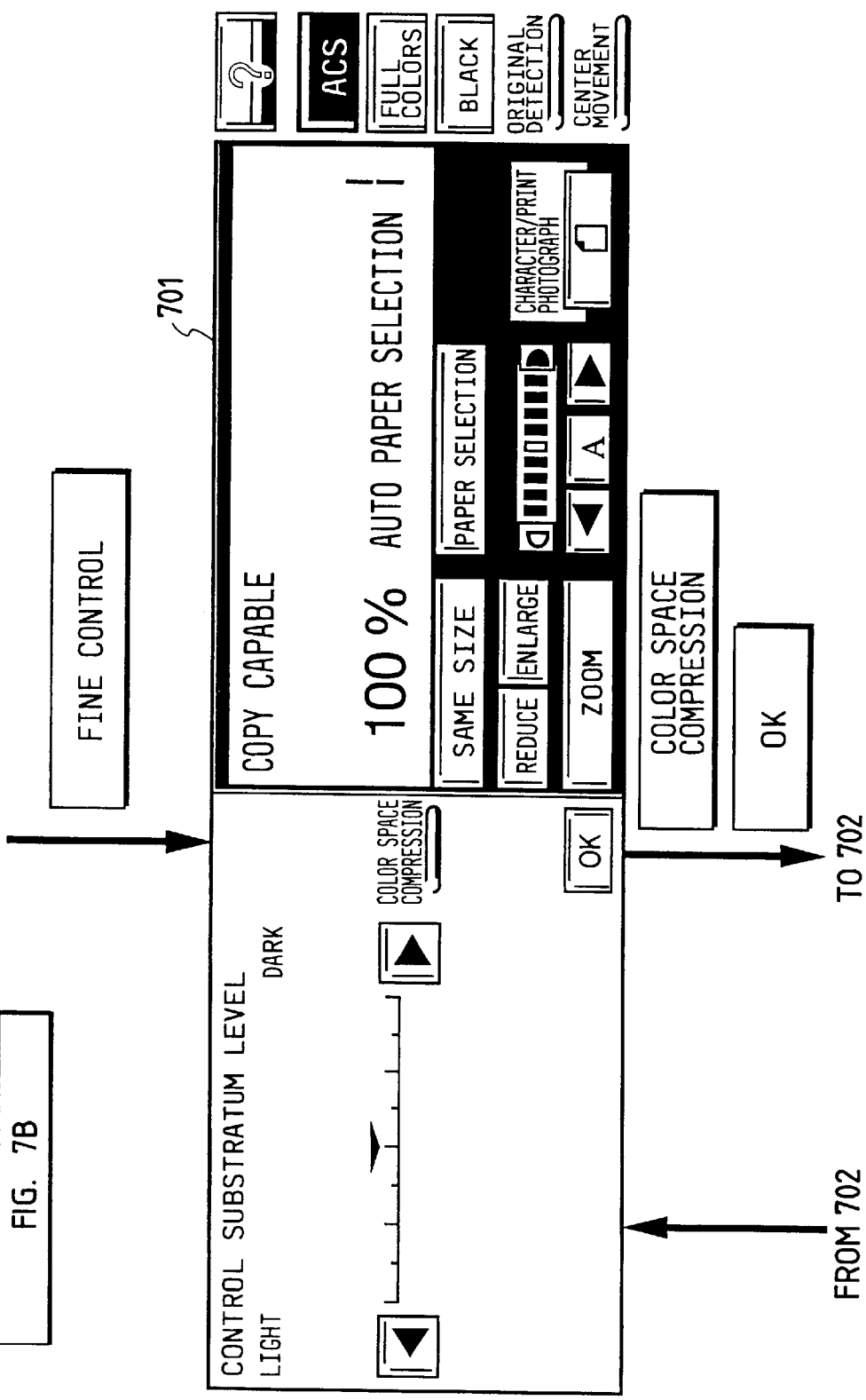

|  |  | COLOR SPACE COMPRESSION ||
|  |  | ON | OFF |
| SUBSTRATUM CONTROL MODE | A | (i) | (ii) |
|  | B | (iii) | (iv) |

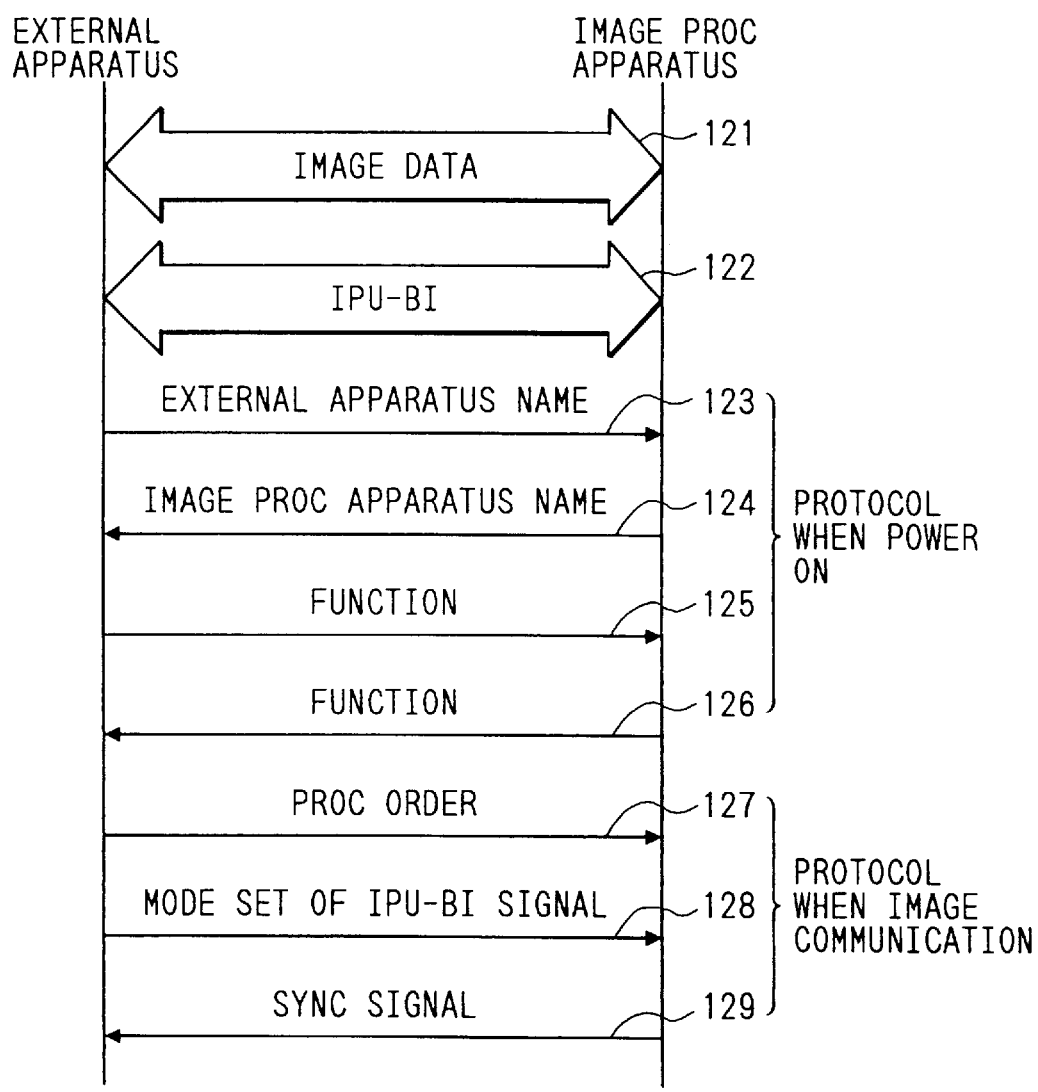

IMAGE PROCESSING APPARATUS AND METHOD

This is a continuation of Ser. No. 08/413,431 filed Mar. 30, 1995 now abandoned.

BACKGROUND OF THE INVENTION

1. Field of the Invention

The invention relates to an image processing apparatus and method for performing a color space compression.

2. Related Background Art

In recent years, there has been considered a color space compressing technique for converting an input color signal to an optimum color signal within a color reconstructing range in which an original expressed by the input color signal including a signal out of a color reconstructing range of an output device can be reconstructed by the output device.

According to the conventional color space compressing technique, however, a color space compression based on an input image cannot be performed.

There is, consequently, a problem such that, for example, in spite of the fact that a color space compressing process has been performed by a host apparatus, the color space compressing process is again executed by an image processing apparatus and it takes a long processing time than it is needed or a reproduction image deteriorates.

SUMMARY OF THE INVENTION

It is an object of the invention to provide image processing apparatus and method which can select whether a color space compression is executed or not on the basis of input image data.

Another object of the invention is that a color space compression is performed to an image signal obtained by scanning an original and a color space compression is not executed to an image signal from an external apparatus, thereby preventing that a color space compressing process is executed to the same image a plurality of number of times.

To accomplish the above objects, according to a preferred embodiment of the invention, there is provided an image processing apparatus comprising: input means for inputting image data; setting means for setting a color space compression processing mode on the basis of a kind of signal format of the inputted image data; and color space compression processing means for performing a color space compressing process to the inputted image data on the basis of the set color space compression processing mode, wherein the color space compression processing mode has a first mode in which a color space compression is performed and a second mode in which the color space compression is not performed.

The above and other objects and features of the present invention will become apparent from the following detailed description and the appended claims with reference to the accompanying drawings.

BRIEF DESCRIPTION OF THE DRAWINGS

FIG. 12 is a diagram showing an example of a flow of signals between an external apparatus and the image processing apparatus.

DETAILED DESCRIPTION OF THE PREFERRED EMBODIMENTS

<Embodiment 1>

The first embodiment of the invention will now be described in detail hereinbelow with reference to the drawings.

(Construction of main body)

Figure 1B:
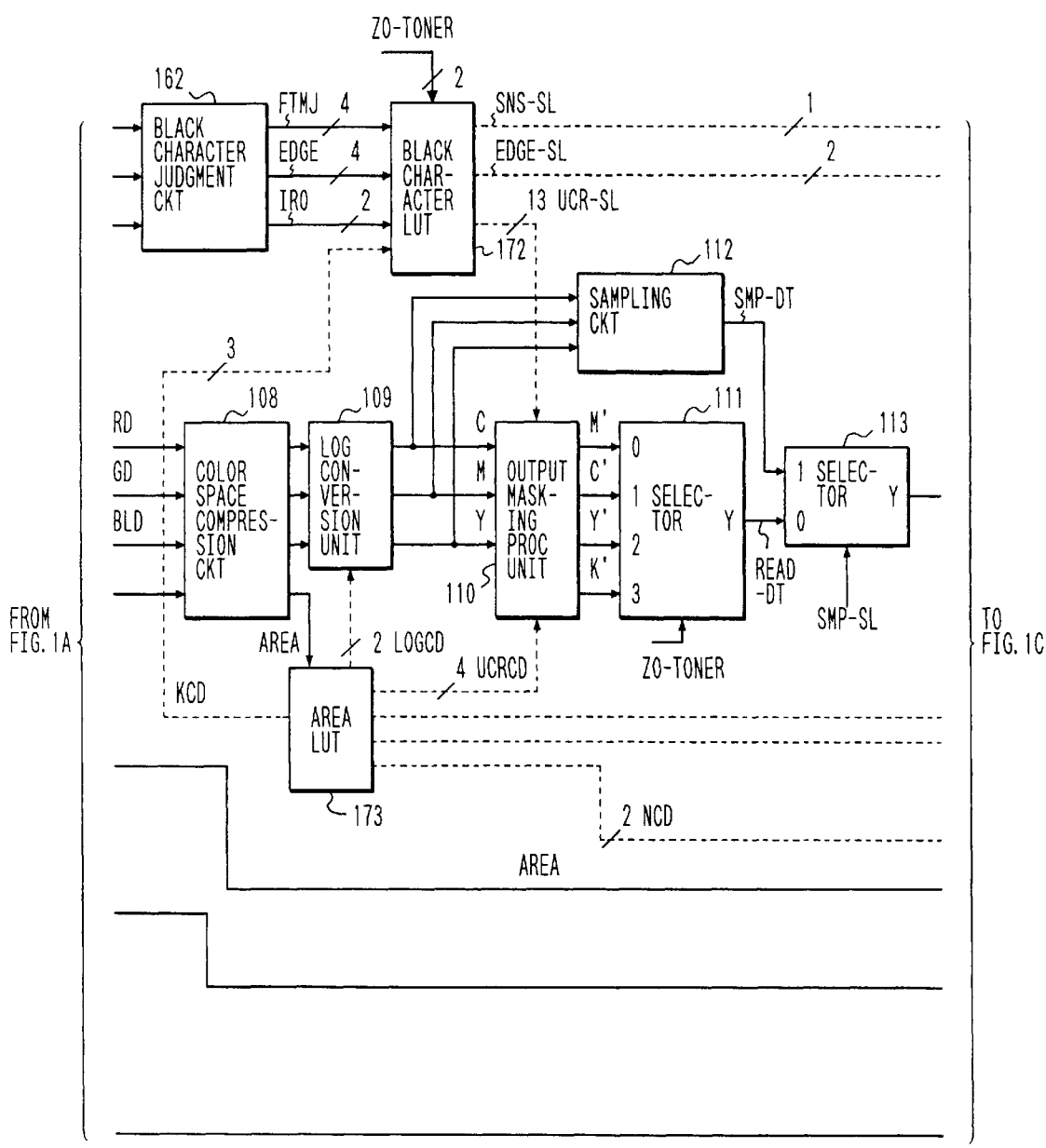
FIG. 1, comprised of FIGS. 1A to 1D, is a block diagram showing an embodiment of an image processing apparatus of the present invention.
Figure 1C:
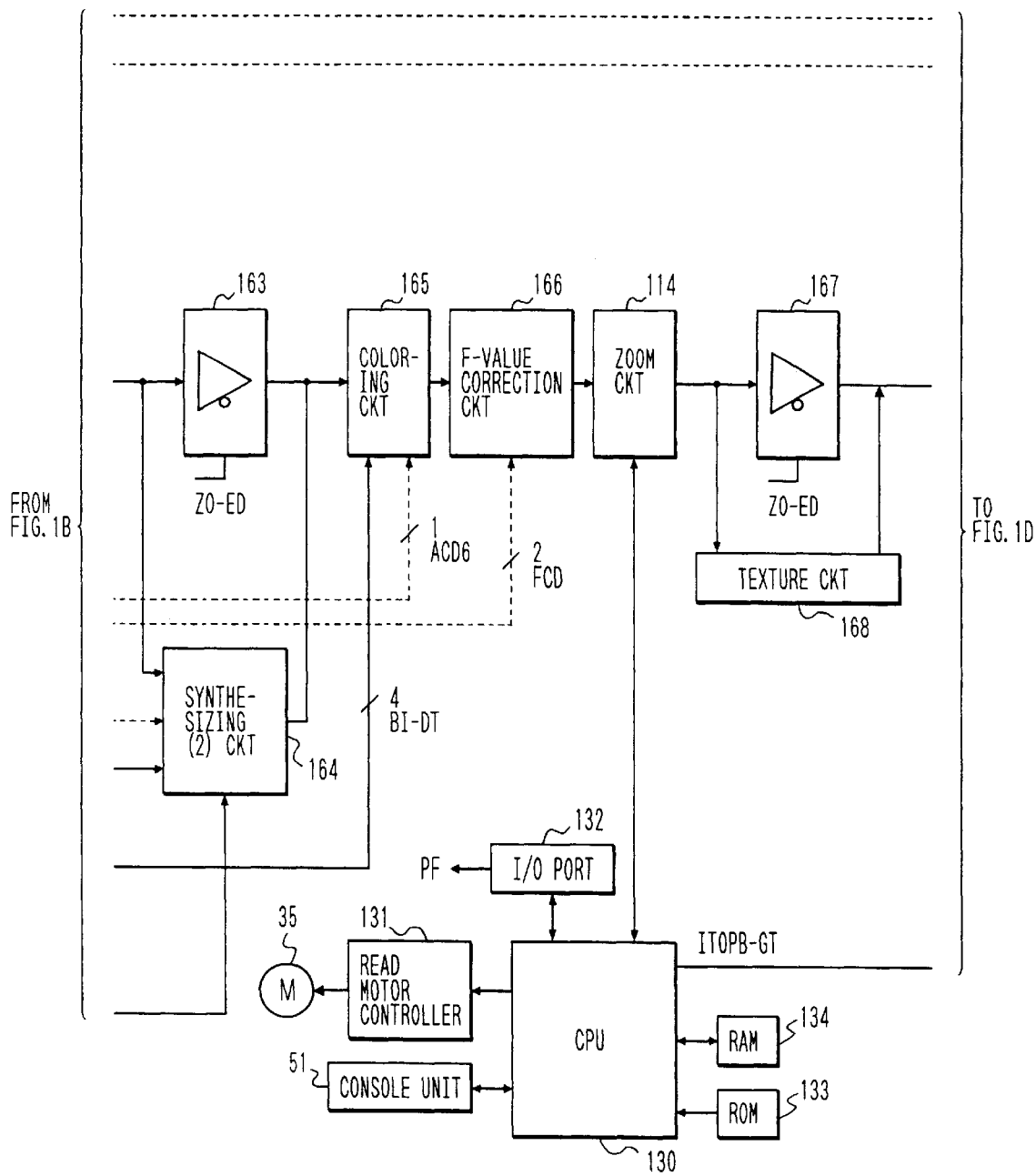
Figure 2:
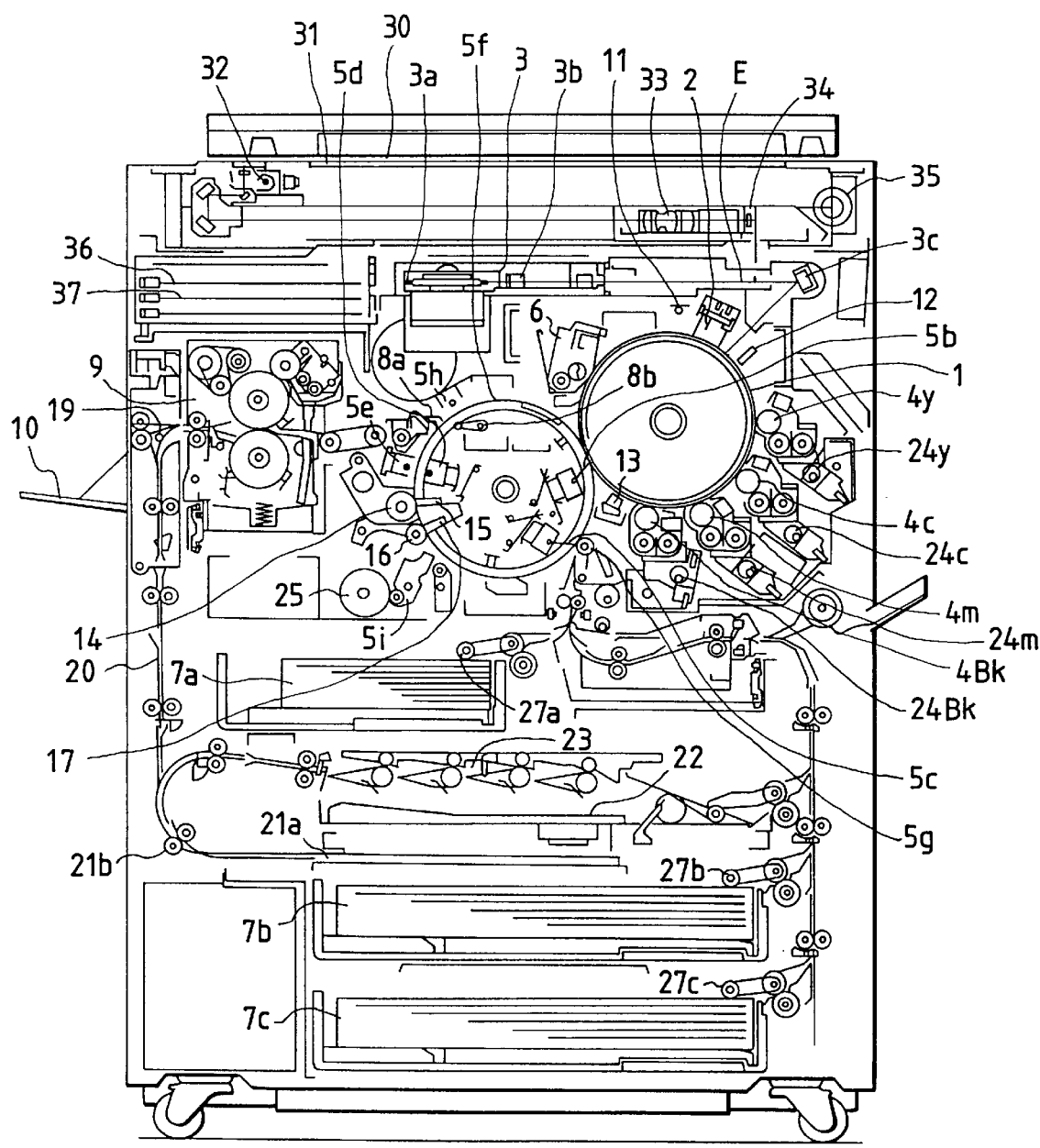
FIG. 2 is a constructional diagram showing an embodiment of the image processing apparatus using the invention.

FIG. 2 is a schematic cross sectional diagram showing an example of a color image processing apparatus of the embodiment.

The embodiment has a digital color image reader unit in an upper portion and a digital color image printer unit in a lower portion.

In the reader unit, an original 30 is placed on an original support plate glass 31. A well-known original scanning unit including an exposure lamp 32 is exposed and scanned by an optical system read drive motor 35 at a predetermined speed according to a preset copy magnification. A reflected light image from the original 30 is converged onto a full-color sensor (CCD) 34 through a lens 33, thereby obtaining a color separation image signal. As a full-color sensor, CCDs of three lines attached with filters of R (red), G (green), and B (blue) arranged so as to be neighboring each other are used. Color separation image signals are subjected to image processes by an image processing unit 36 and a controller unit 37 and the processed signals are supplied to the printer unit.

A console unit 51 (which will be explained hereinlater) is provided around the original support plate glass 31. Switches to set various modes regarding a copy sequence, a display screen to display, and a display apparatus are arranged.

In the printer unit, a photosensitive drum 1 as an image holding member is held so as to be rotatable in the direction of an arrow. A pre-exposure lamp 11, a corona charging device 2, a laser exposure optical system 3, a potential sensor 12, four developing devices 4y, 4c, 4m, and 4Bk of different colors, means 13 for detecting a light amount on the drum; a transfer apparatus (5b to 5h), and a cleaning device 6 are arranged around the photosensitive drum 1.

In the laser exposure optical system 3, an image signal from the reader unit is converted to a light signal by a laser output unit (not shown). The converted laser beam is reflected by a polygon mirror 3a and passes through a lens 3b and a mirror 3c and is projected to the surface of the photosensitive drum 1.

When the image is formed in the printer unit, the photosensitive drum 1 is rotated in the direction of an arrow. After the photosensitive drum 1 was discharged by the pre-exposure lamp 11, the drum 1 is uniformly charged by the corona charging device 2. A light image E is irradiated every separation color and a latent image is formed.

Subsequently, a predetermined developing device is made operative and the latent image on the photosensitive drum 1 is developed, thereby forming a toner image made of a resin as a base substance onto the photosensitive drum 1. The developing device is alternatively allowed to approach the photosensitive drum 1 in accordance with each separation color by the operations of eccentricity cams 24y, 24m, 24c, and 24Bk.

Further, the toner image on the photosensitive drum 1 is transferred to a recording member supplied from one of recording member cassettes 7a, 7b, and 7c which has previously been selected to a position which faces the photosensitive drum 1 through a conveying system and a transfer apparatus 5. The selection of the recording member cassette is performed by previously driving either one of pickup rollers 27a, 27b, and 27c by a control signal from the controller unit 37 in accordance with a size of recording image.

In the embodiment, the transfer apparatus 5 has: a transfer drum 5a; a transfer charging device 5b; an adsorption roller 5g which faces an adsorption charging device 5c for electrostatically adsorbing the recording member; an inside charging device 5d; and an outside charging device 5e. A recording member holding sheet 5f made of a dielectric material is cylindrically integrally suspended in a peripheral surface open area of the transfer drum 5a that is axially supported so as to be rotated. A dielectric material sheet such as a polycarbonate film or the like is used as a recording member holding sheet 5f.

As the drum-shaped transfer apparatus, namely, the transfer drum 5a is rotated, the toner image on the photosensitive drum is transferred onto the recording member held on the recording member holding sheet 5f by the transfer charging device 5b.

A desired number of color images are transferred to the recording member that is adsorbed to the recording member holding sheet 5f and is conveyed, thereby forming a full-color image.

In case of forming a full-color image, after completion of the transfer of the toner images of four colors as mentioned above, the recording member is separated from the transfer drum 5a by functions of a separating nail 8a, a separation pushing-up roller 8b, and a separation charging device 5h and is ejected onto a tray 10 through a thermal roller fixing device 9.

On the other hand, after completion of the transfer of the toner images, the residual toner on the surface of the photosensitive drum 1 is cleaned by the cleaning device 6. Subsequently, the drum 1 is again subjected to the image forming processes.

In case of forming images on both sides of the recording member, a conveying path switching guide 19 is soon driven after the recording member was ejected out of the fixing device 9. The recording member passes through a conveying vertical path 20 and is once guided to a reversing path 21a.

After that, a rear edge of the recording member when it is fed is set to a front edge by the reverse rotation of a reversing roller 21b and the recording member is moved backward in the direction opposite to the feeding direction and is enclosed into an intermediate tray 22. Subsequently, an image is again formed onto another side by the foregoing image forming processes.

To prevent a dispersion and deposition of powder onto the recording member holding sheet 5f of the transfer drum 5a, a deposition of an oil onto the recording member, or the like, a cleaning operation is performed by functions of a far brush 14 and a backup brush 15 which faces the brush 14 through the recording member holding sheet 5f and by functions of an oil removing roller 16 and a backup brush 17 which faces the roller 16 through the recording member holding sheet 5f. Such a cleaning operation is performed before or after the image formation. When a jam (paper jam) occurs, such a cleaning operation is executed any time.

In the embodiment, an eccentricity cam 25 is made operative at a desired timing and a cam follower 5i which is integrated with the transfer drum 5a is made operative, thereby enabling a gap between the recording member holding sheet 5f and the photosensitive drum 1 to be arbitrarily set. For example, in a standby state or when the power source is turned off, the transfer drum and the photosensitive drum is away from each other.

(Image processing block)

FIGS. 1A to 1D show an image processing unit, a controller unit, and their peripheral units to be controlled. The full-color sensor (CCD) 34 is constructed by CCDs 101, 102, and 103 of three lines of red, green, and blue and color separates light information of one line from the original and outputs electric signals of R, G, and B at a resolution of 400 dpi. In the embodiment, since an image of maximum 297 mm (longitudinal direction of the A4 size) is read as one line, an image of 4677 pixels of one line for each of R, G, and B is generated from the CCD. Reference numeral 104 denotes a sync signal generation circuit constructed by a main scan address counter, a sub scan address counter, and the like. The main scan address counter is cleared by a BD signal as a sync signal for laser recording of each line to the photosensitive drum, counts a VCLK signal from a pixel clock generator 105, and generates a count output H-ADR corresponding to each pixel of the image information of one line read out from the CCD 34. As for the count output H-ADR, the counter counts up from 0 to 5000 and the image signal of one line from the CCD 34 can be sufficiently read out. The sync signal generation circuit 104 generates various kinds of timing signals such as line sync signal LSYNC, main scan effective interval signal VE and sub scan effective interval signal PE of the image signal, and the like.

Reference numeral 106 denotes a CCD drive signal generation unit for decoding the count output H-ADR and generates a set pulse and a CCD-DRIVE signal as a transfer clock from a shift pulse of the CCD. Thus, the color separation image signals of R, G, and B for the same pixel are sequentially outputted from the CCD synchronously with a signal VCLK. Reference numeral 107 denotes an A/D converter for converting each of the image signals of red, green, and blue into the digital signal of eight bits.

Reference numeral 150 denotes a shading correction circuit for correcting a variation of a signal output of every pixel in the CCD. The shading correction circuit has a memory of one line of each of the signals of R, G, and B and reads an image of a white board having a predetermined density by the optical system and uses the read image signal as a reference signal.

Reference numeral 151 denotes a sub-scan threading circuit for absorbing that the image signal read by the CCD is deviated in the sub scan direction by eight lines at a time.

Reference numeral 152 denotes an input masking circuit for eliminating a color turbidity of each of the input signals R, G, and B by a matrix arithmetic operation of (3×3).

Reference numerals 153, 163, and 167 denote buffers each for allowing the image signal to pass when a ZO-ED signal is at the L level and for preventing that the image signal passes when the ZO-ED signal is at the H level. Ordinarily, the ZO-ED signal is at the L level when using an editing function.

In an editing circuit unit 154, reference numeral 155 denotes a filter for smoothing the image signal and a matrix arithmetic operation of (5×5) is performed.

Reference numeral 156 denotes a color conversion circuit having functions for converting the image signals of RGB to color space coordinates of HSL, converting the color which has previously been designated in an HSL color space to another designated color, and again returning to the color space of RGB.

Reference numeral 159 denotes an external apparatus such as IPU constructed by a memory apparatus for storing the image signal of up to the A3 size, a computer for controlling the memory apparatus, and the like, host computer for performing various image processes, film scanner, or the like.

The external apparatus inputs and outputs the image signals in a form of parallel signals of red, green, and blue (RGB), area-sequential image signals of cyan, magenta, yellow, and black (CMYK), binary signal, or the like.

In case of inputting the CMYK area-sequential image signals, the image signals are transferred by using an R line.

Between the external apparatus 159 and the image processing apparatus, in addition to the image signals as mentioned above, the communication of an IPU-BI signal and a status command is executed by using one channel which can perform a two-way communication.

The IPU-BI signal is a 1-bit signal and can be used as, for example, a parameter control for various image processes, an area signal, or the like.

The status command is used in the sync signal or a protocol that is executed at the time of turn-on of the power source or at the time of image communication.

FIG. 12 shows a communication between the external apparatus and the image processing apparatus.

In the protocol at the time of turn-on of the power source, an external apparatus name 123 and a function 125 are sent from the external apparatus 159 to the image processing apparatus. Similarly, an image processing apparatus name 124 and a function 126 are sent from the image processing apparatus to the external apparatus.

In the protocol at the time of image communication, a processing order 127 and a mode set 128 of the IPU-BI signal are sent from the external apparatus 159 to the image processing apparatus. The sync signal is sent from the image processing apparatus to an engine in order to synchronize a transfer image signal.

Reference numeral 158 denotes an interface (I/F) circuit for matching the timings and speeds between the image signal from the external apparatus and the internal image signal.

Reference numeral 160 denotes an area generation circuit for generating and storing information indicative of an area designated by an editor or the like. A MARKER signal in which an image signal of a marker pen or the like drawn on the original was extracted can be also used as an area. An SC-BI signal in which the image signal read by the CCD was binarized is used as an independent area signal for a Z-BI output signal.

Reference numeral 157 denotes a synthesizing (1) circuit for synthesizing the RGB signal read by the CCD and the RGB image signal or YMCK image signal from the external apparatus 159. An area to be synthesized is designated by an AREA signal from the area generation circuit 160 or the IPU-BI signal from the external apparatus. A replacement synthesis and an openwork synthesis are executed in the synthesizing (1) circuit 157. The replacement synthesis in which the image signal from the CCD and the image signal from the external apparatus are independently synthesized every area (either one of the image signals is selected every pixel), the image signal from the CCD can be synthesized to the RGB or CMYK image signal from the external apparatus. On the other hand, in the openwork synthesis in which two images are simultaneously synthesized so as to be overlapped and openworked (both of the image signals are mutually operated every pixel), the image signal from the CCD can be synthesized to only the RGB signal from the external apparatus of the same signal format. Further, a synthesis of the RGB image signal from the CCD and the binary image from the external apparatus or the like can be also performed. In the openwork synthesis, an openwork ratio indicating which amount of which one of the two images is synthesized so as to be openworked can be also designated.

The designation of the area in the replacement synthesis is performed on the basis of the IPU-BI signal or the area signal formed by the area generation circuit 160.

That is, in case of designating the area on the external apparatus side, the IPU-BI signal is used. In case of designating the area on the image processing apparatus side such as a digitizer or the like, the area signal is used. A CPU 130 controls the synthesizing (1) circuit on the basis of the area designation.

In case of using the IPU-BI signal, a mode such that the CPU 130 analyzes the IPU-BI signal mode set 128 as a status command in the protocol and the IPU-BI signal is used for area designation of the replacement synthesis is set.

After that, the IPU-BI signal passes through a signal line by which an area signal which is produced by the area generation circuit 160.

Reference numeral 161 denotes a contour generation circuit for extracting a contour for the SC-BI signal in which the image signal read by the CCD was binarized, the IPU-BI signal as binary data from the external apparatus, or the Z-BI signal as binary data from the area generation circuit, thereby generating a shadow.

Reference numeral 162 denotes a black character judgment circuit for judging a feature of the image signal which matches with the original image before the color space compressing process at a high fidelity and generates thickness signals (degrees of bold characters) FTMJ of eight kinds of characters, an edge signal EDGE, and a color signal IRO to a black character LUT 172.

By executing the black character judgment for the image signal before the image signal is converted by the color space compressing process, the black character judgment which matches with the original at a high fidelity can be performed and the image of a high picture quality can be obtained.

The invention is not limited to the apparatus for performing the black character judgment but can be also applied to an apparatus for judging a feature of an original image such as pattern recognition, black and white/color judgment of the original, or the like.

Reference numeral 108 denotes a color space compression circuit for performing the following matrix arithmetic operation (1).

$$\begin{pmatrix} R' \\ G' \\ B' \end{pmatrix} = \begin{pmatrix} R \\ G \\ B \end{pmatrix} + \begin{pmatrix} a11 & a12 & a13 & a14 & a15 & a16 & a17 & a18 \\ a21 & a22 & a23 & a24 & a25 & a26 & a27 & a28 \\ a31 & a32 & a33 & a34 & a35 & a36 & a37 & a38 \end{pmatrix} \times \begin{pmatrix} R-X \\ G-X \\ B-X \\ (R-X) \times (G-X) \\ (G-X) \times (B-X) \\ (B-X) \times (R-X) \\ R \times G \times B \\ (255-R) \times (255-G) \times (255-B) \end{pmatrix} \quad (1)$$

where, X denotes the minimum value of the input signals R, G, and B.

Figure 3:
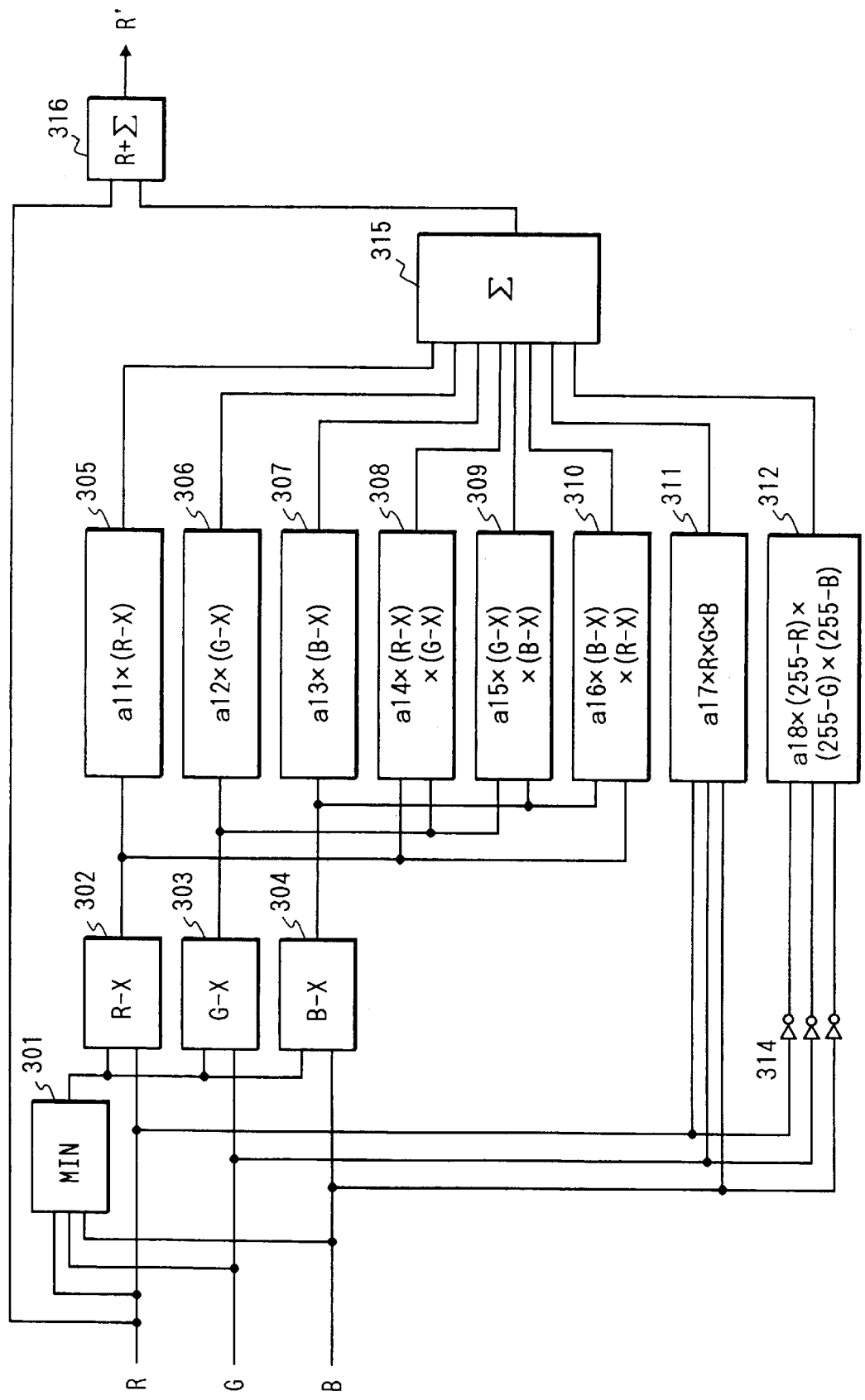
FIG. 3 is a block diagram showing an embodiment of a color space compression circuit in the image processing apparatus of the invention.

FIG. 3 shows a detailed diagram of a circuit for arithmetically operating an R' output in the color space compression circuit. Reference numeral 301 denotes a minimum value extracting circuit for extracting the minimum value X among the R, G, and B signals inputted to the color space compression circuit and for outputting the minimum value signal X. Reference numerals 302, 303, and 304 denote subtracting circuits each for obtaining a difference between the input signal and the minimum value signal. The subtracting circuit 302 outputs (R−X), the 25 subtracting circuit 303 outputs (G−X), and the subtracting circuit 304 outputs (B−X). Reference numerals 305 to 312 denote multiplying circuits. The multiplying circuit 305 executes a multiplication of [(a matrix coefficient all)×(R−X)]. In a manner similar to the above, the multiplying circuit 306 executes a multiplication of [a12×(G−X)]; 307 . . . [a13×(B−X)]; 308 . . . [a14×(R−X)×(G−X)]; 309 . . . [a15×(G−X)×(B−X)]; 310 . . . [a16×(B−X)×(R−X)]; and 311 . . . [a17×R×G×B], respectively. Since the signal inverted by an NOT gate 314 is inputted, the multiplying circuit 312 executes a multiplication of [a18×(255−R)×(255−G)×(255−B)]. The signals multiplied as mentioned above are respectively added by an adding circuit 315 and is further added with an R signal by an adding circuit 316, thereby outputting as an R' signal. G' and B' signals are also generated in a manner similar to the foregoing R' signal.

The term up to R−X to (B−X)×(R−X) executes the color space compression. The term of (R×G×B) executes a chromatic color substratum level control. The term of [(255−R)×(255−G)×(255−B)] executes a dark level correction.

The chromatic color substratum level control is executed in consideration of a substratum color tone, namely, a substratum color component ratio.

Further, since the chromatic color substratum level control is performed by using the equation (1), the substratum level control can be executed on the basis of a function that is non-linear and continuous for the input image data.

Therefore, by performing the chromatic color substratum level control, for example, when the user wants to erase yellow color as a substratum from an original having a yellowish color, only the substratum yellowish portion can be erased and other pale colors such as magenta different from the yellowish color or the like.

Therefore, since an influence is hardly exerted on another pale color in which the user can erase only the unnecessary substratum, the user can execute a desired substratum level control.

Moreover, since the sub stratum level control is executed on the basis of the non-linear and continuous function, a gradation can be preferably reconstructed from the pale color in a color near the color tone of the original from which the substratum is eliminated.

In the case where it is better not to perform the color space compression such as a case where the color space compressed color signal is inputted from the external apparatus, the CPU 130 switches the color space compression to an OFF state on the basis of the area signal AREA.

Namely, the color space compression is set to be through in an image area from the external apparatus shown by the IPU-BI signal.

When the color space compression is in the OFF state, the coefficient regarding the color space compression that is used in the matrix arithmetic operation (1) is set to 0.

Similarly, in the case where the chromatic color substratum level control is not performed, the coefficient regarding the chromatic color substratum level is set to 0.

Therefore, in the case where the replacement synthesis of the image read by the CCD and the image from the external apparatus or the like was executed, processes such that the color space compression is executed to the image read by the CCD and the color space compression is not performed to the image from the external apparatus can be executed. A situation such that the color space compression is executed twice for the image from the external apparatus can be avoided and an image which matches with the original at a high fidelity and hardly deteriorates can be obtained.

Further, an editing process using a single image signal without mixing the signal from the external apparatus to the read signal such as a replacement synthesis or the like can be executed to the same area by the synthesizing (1) circuit provided before the color space compression circuit irrespective of whether the input signal is the signal from the external apparatus or the signal read from the CCD or whether the color space compression is necessary or not. The same editing circuit for performing an edition such as synthesis or the like doesn't need to be provided before and after the color space compression circuit. A circuit scale and the costs can be reduced.

In case of inputting the CMYK area-sequential image signals from the external apparatus, the CPU 130 is controlled so as to make the color space compression through for the image area from the external apparatus that is designated on the basis of the IPU-BI signal.

By performing the substratum level control and dark level control of the chromatic color in addition to the color space compression by the matrix arithmetic operation (1) of the color space compression circuit, the circuit scale and the costs can be reduced. A good image can be obtained without exerting a fault to each correction by each correction.

Reference numeral 109 denotes a light amount-density conversion unit (LOG conversion unit) for converting the 8-bit light amount signals of red, green, and blue to the 8-bit density signals of cyan (C), magenta (M), and yellow (Y) by the logarithm conversion, respectively.

On the basis of a LOGCD signal which is produced in an area LUT 173, which will be explained hereinlater, the LOG conversion unit 109 executes the light amount-density conversion when the input signal format is the RGB format and doesn't perform the light amount-density conversion when the input signal format is the CMYK format.

Therefore, since the processes are changed on the basis of the input signal format, the optimum conversion can be performed for the input signal.

Further, since the processes can be made through in both of the color space compression circuit 108 and LOG conversion unit 109 as mentioned above, there is no need to change a path of the signal in accordance with the format of the input color signal and the circuit scale and the costs can be reduced.

The LOG conversion unit 109 executes an achromatic color substratum level control for controlling a highlight portion by executing the same light amount-density conversion in a lump for the RGB signals after completion of the color space compression.

Different from the chromatic color substratum level control that is executed in the color space compression circuit 108 mentioned above, according to the achromatic color substratum level control, the same substratum level control is executed in a lump to each color component of the input color signal irrespective of the chromatic color or achromatic color without considering the color tone of the substratum of the input color signal, namely, the color component ratio of the substratum.

Therefore, different from the foregoing chromatic substratum level control, since the control can be executed in a lump for the output image signal after completion of the color space compression, the substratum level control of the achromatic color can be executed. A highlight control in the achromatic color according to the output image can be performed and a good image according to the desire of the user can be obtained.

Reference numeral 110 denotes an output masking processing unit to execute well-known masking arithmetic operations for extracting the density signal of black from the density signals of three colors of C, M, and Y by a well-known UCR process (undercolor removing process) and for eliminating a color turbidity of a developing agent corresponding to each density signal. From the density signals of M', C', Y', and K' formed as mentioned above, the signal of the color corresponding to the developing agent that is used at present is selected by a selector 111. A ZO-TONER signal is a 2-bit signal which is generated from the CPU for color selection. When the ZO-TONER signal is equal to 0, the M' signal is outputted as an READ-DT signal. Likewise, when the ZO-TONER signal is equal to 1, the C' signal is outputted. When ZO-TONER is equal to 2, the Y' signal is outputted. When ZO-TONER is equal to 3, the K' signal is outputted.

Reference numeral 112 denotes a sampling circuit for sampling the inputted image signals R, G, and B and a density signal ND produced from the image signals R, G, and B every four pixels and serially outputting as R, G, B, and ND signals. The density signal ND is expressed by, for example, (R+G+B)/3. Reference numeral 113 denotes a selector for selecting the image signal READ-DT when an SMP-SL signal is set to the L level by the CPU and outputs. When the SMP-SL signal is set to the H level, the selector 113 selects a sampling signal SMP-DT and outputs.

Reference numeral 164 denotes a synthesizing (2) circuit for openwork synthesizing the image signal read by the CCD and the image signal of the CMYK format that is inputted from the external apparatus 159. When the CMYK synthesis is executed, the color signal corresponding to the developing agent that is used at present is inputted one page by one from the external apparatus in accordance with the image signal from the CCD. The area to be synthesized is switched by the CPU 130 on the basis of the AREA signal, namely, IPU-BI signal in a manner similar to the RGB synthesizing (1) circuit 157.

The processes for arithmetically operating a plurality of image signals and producing an edition image signal for the same area like an openwork synthesis cannot be arithmetically operated unless a plurality of image signals have the same signal format. Therefore, with respect to the CMYK image that is inputted from the external apparatus, the RGB signals read by the CCD are converted to the signals of the CMYK signal format by the LOG conversion or the like and, after that, they are processed by using the synthesizing (2) circuit.

Reference numeral 165 denotes a coloring circuit for executing a process, for example, for adding a preset color to a black and white image. A color can be also added to a binary image signal IPU-BI from the external apparatus. Further, a gradation pattern such that the gradation gradually changes can be also formed. Reference numeral 166 denotes an F value correction circuit for executing a gamma process according to the developing characteristics of the printer. A density can be also set every mode.

Reference numeral 114 denotes a zoom circuit, having a memory of one line of the image signal, for executing an enlargement or reduction of the image signal in the main scan direction or an oblique copying process for outputting the image in an oblique state. Upon sampling, sampling data is accumulated in the memory and is used to form a histogram.

Reference numeral 168 denotes a texture circuit for synthesizing a pattern obtained by binarizing the image signal which has previously been read by the CCD or a binary pattern inputted from the external apparatus to the color image signal read by the CCD and outputs a synthesized signal.

Reference numerals 169 and 170 denote a smoothing circuit and an edge emphasis circuit each of which is constructed by a filter of (5×5).

Reference numeral 171 denotes an add-on circuit for multiplexing a coded pattern to specify the number which is peculiar to the apparatus to the image signal and outputting the multiplexed signal.

Reference numeral 115 denotes a laser and laser controller for controlling a light emission amount of the laser in accordance with a VIDEO signal as a density signal of eight bits. The laser beam is scanned in the axial direction of the photosensitive drum 1 by the polygon mirror 3a and forms an electrostatic latent image of one line onto the photosensitive drum. Reference numeral 116 denotes a photodetector, provided near the photosensitive drum 1, for detecting a passage of the laser beam just before the photosensitive drum 1 is scanned and generating a sync signal BD of one line.

Reference numeral 173 denotes an area LUT (lookup table) circuit for setting each mode in accordance with AREA signal from the area generation circuit 160. The LOGCD signal as an output of the area LUT circuit 173 is used for switching an LOG table of the LOG conversion unit 109 to a through setting or the like. A UCRCD signal is used for performing a trimming or masking by the output masking processing unit 110. An FCD signal is used to change a magnitude of an F value of the F-value correction circuit 166. An ACD6 signal is sent to the coloring circuit 165. An NCD signal is sent to the synthesizing (2) circuit 164. The KCD signal is connected to a black character LUT circuit 172. Various modes are set, respectively.

Reference numeral 172 denotes the black character LUT circuit for executing various processes by an output of the black character judgment circuit 162. For example, a UCR-SL signal is used to execute processes such that a UCR amount of the output masking circuit 110 is changed and an amount of black is further increased and amounts of C, M, and Y are further reduced for the area which is judged as a black character and the development is performed and the like. An EDGE-SL signal is used to perform a setting to switch to a filter in a manner such as to emphasize an edge portion for an area of a black character in the smoothing circuit 169 and the edge emphasis circuit 170. Further, an SNS-SL signal is used to switch the number of lines (400 lines/200 lines) of the PWM control in the laser controller 115 for an output of the black character LUT circuit 172. Namely, in the area judged as a black character, the development is performed by 400 lines in order to raise the resolution. In the other image areas, the development is executed by 200 lines in order to raise the gradation.

As mentioned above, the black character judgment circuit 162 can judge a feature regarding a black character on the basis of the image signal which matches with the original image at a high fidelity before the color space compressing process is executed.

Therefore, the black character LUT circuit 172 can output a control signal to control each process for setting the black character in a reproduction image to a high picture quality on the basis of the feature regarding the black character which was correctly judged.

Therefore, each process regarding the black character can be optimally controlled without being influenced by the color space compressing process.

Reference numeral 118 denotes a photosensor for detecting that the transfer drum 5a arrives at a predetermined position, generates a page sync signal ITOP, initializes a sub scan address counter of the sync signal generation circuit 104, and supplies the ITOP signal to the CPU. Reference numeral 130 denotes the CPU for controlling each block (not shown). That is, for example, the CPU 130 analyzes a protocol with the external apparatus and a status command and IPU-BI signal from the external apparatus and controls each block.

Reference numeral 131 denotes a controller for controlling forward/reverse rotation and a rotational speed of the read motor 35. Reference numeral 132 denotes an I/O port for controlling other sensors and actuators which are necessary to control the copying operation. A PF signal for feeding a paper from a paper cassette is also included in the I/O port 132. As another signal, a size of paper is detected by a paper size sensor (not shown) attached to the paper cassette and a size detection signal is inputted from the I/O port to the CPU. Reference numeral 51 denotes the console unit for instructing the number of copies and various kinds of operating modes such as color space compression, substratum control mode, and the like.

Reference numeral 133 denotes an ROM in which programs which are used in the CPU and preset values have been stored. Reference numeral 134 denotes an RAM to temporarily store data. Set values which are newly set and the like are also stored in the RAM.

In the above description, as a method of bypassing the processes of the color space compression circuit and LOG conversion unit, it is also possible to provide a selector circuit and to directly input to the next processing circuit without passing through the processing circuit when the process is bypassed.

(Sequence)

Figure 4:
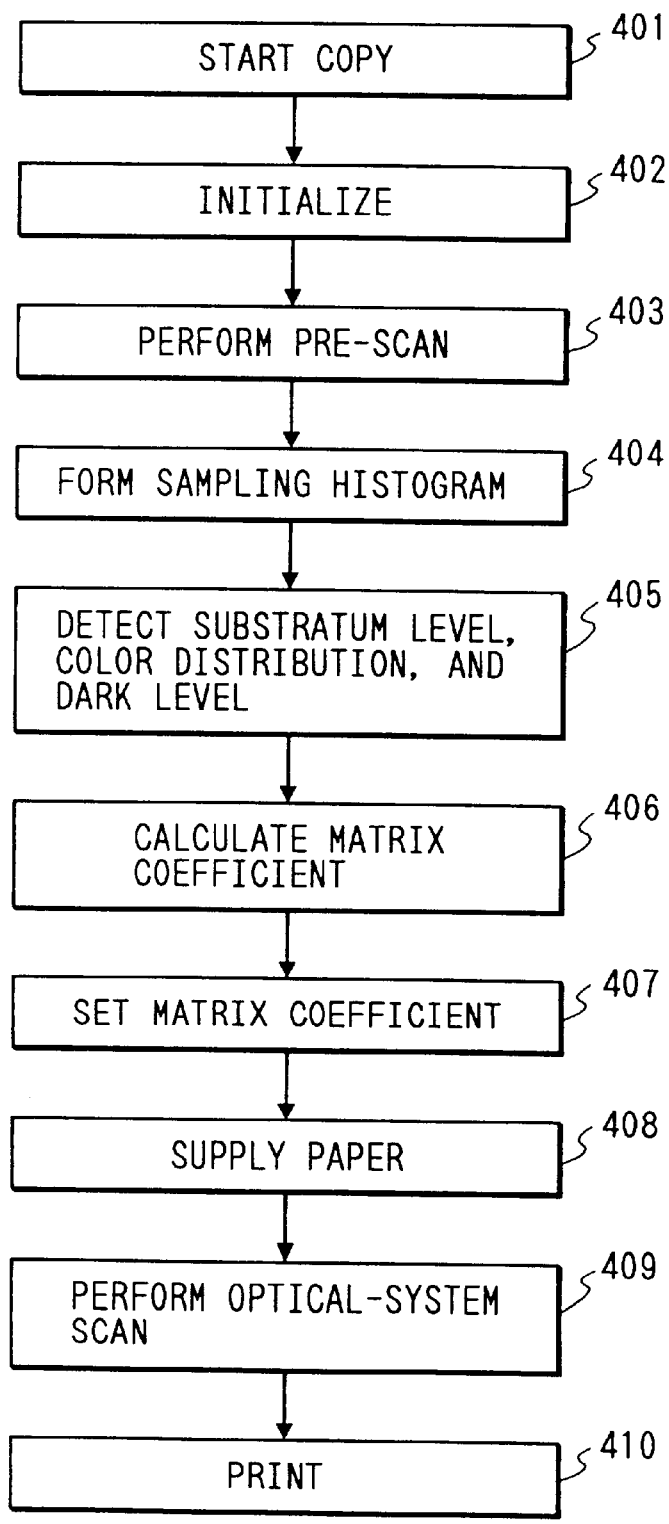
FIG. 4 is a flowchart showing an example of image processes of the invention.

A sequence for the color space compression will now be described with reference to a flowchart of FIG. 4. First in step 401, when the original is placed on an original support plate glass and a copy start key is depressed, an initialization is performed in step 402. In this instance, the selector 113 selects the output SMP-DT of the sampling circuit. In step 403, a pre-scanning operation to read the image signal by the optical system is executed. At this time, the image forming unit as a printer doesn't operate. The image signals R, G, and B read in step 404 are sequentially converted to the serial data by the sampling circuit unit in accordance with the order of R, G, and B (density signals) and are sequentially written into the memory of the conversion circuit. In this instance, a 3-dimensional histogram is formed on the basis of the input image signals by the CPU. Portions of high frequencies of highlight portions are detected as substratum levels and are stored as RW, GW, and BW=(RGB)W. A color distribution is subsequently detected. A color distribution detection is performed for the color signal having the highest saturation among the color signals out of the color reconstructing range of the color output unit with respect to fundamental primary colors (R, G, B, C, M, Y). For the respective fundamental primary colors, the detected color distributions are stored in the following forms.

(RGB)R, (RGB)G, (RGB)B, (RGB)C, (RGB)M, (RGB)Y=(RGB)L where,

L=1 to 6

Further, a dark level is detected. For example, among the signals in which all of the RGB signals are equal to or less than predetermined values $R_{PD}$, $G_{PD}$, and $B_{PD}$ such as $R<R_{PD}$ and $G<G_{PD}$ and $B<E_{PD}$ the minimum signal is stored as a dark level $(RGB)_D$. $R_{PD}$, $G_{PD}$, and $B_{PD}$ show the $R_{GB}$ signals of the darkest black color which is color reconstructed by the apparatus.

Matrix arithmetic operation coefficients are obtained in step 406. Namely, in the equation of the matrix arithmetic operation (1), 24 values of the substratum level $(RGB)_W$, color distribution $(RGB)_L$, and dark level $(RGB)_D$ detected in step 405 are set to the values R, G, and B before conversion. The maximum level which can be reconstructed by the apparatus for each of those values is previously stored as a target and is set to the values R', G', and B' after completion of the conversion of the matrix arithmetic operation (1). Thus, 24 simultaneous linear equations are formed. By solving those equations, the matrix coefficients can be calculated.

In step 407, the 24 calculated matrix coefficients all to a38 are set into the color space compression circuit. The selector 113 selects the output READ-DT of the selector 111.

The paper according to the output image is fed in step 408. While the optical system is moved, the original image is read and the image signal is matrix arithmetically operated by the color space compression circuit every image synchronously with the reading operation in step 409. In step 410, the magenta component signal M' selected by the selector 111 is developed as a VIDEO signal. In a manner similar to the above, the cyan component signal C', yellow component signal Y', and black component signal K' are developed in accordance with this order, so that a full-color image is printed.

As mentioned above, by synchronously executing a series of operations such as image process and image formation as well as the reading of the original image and the color space compression, the image can be formed in a real-time manner by the color space compression in consideration of the color reconstructing range of the device without needing the memory of one picture plane.

In the above embodiment 1, it has been regarded that the image signal from the external apparatus was color space compressed, so that the control has been made so as to set the color space compression to be through. The invention, however, is not limited to such a control method.

Namely, as mentioned above, the image processing apparatus can receive signals of various signal formats such as RGB image signals, CMYK image signals, and the like from the external apparatus.

Therefore, it is also possible to judge whether the color space compression is performed or not on the basis of the signal format irrespective of the input destination of the image signal.

Specifically speaking, a control is performed so as to set the color space compression to be through for the RGB image signals and to execute the color space compression for the CMYK image signals. In this instance, the signal format is judged in a manner such that the image signals which are obtained from the CCD 34 are the RGB image signals. On the other hand, the signal format of the image signals which are inputted from the external apparatus is judged by the CPU on the basis of the status or IPU-BI signal.

The signal format of the input image signals can be also manually designated by the console unit 51.

In the embodiment, although the color space compression circuit 108 and LOG conversion circuit 109 have been set to be through, it is also possible to construct so as to bypass those circuits.

<Embodiment 2>

The second embodiment of the invention will now be described in detail hereinbelow with reference to the drawings.

An image processing apparatus of the embodiment is constructed by further adding functions to the apparatus of the first embodiment mentioned above. The ON/OFF operations of the color space compression, substratum level correction, and dark level correction can be independently manually set. FIGS. 5A to 5D show examples of a liquid crystal display unit of the console unit 51 in the above first embodiment. A key operation can be performed by a touch-key. In a window 501, when a "substratum level control" key is touched, a display window 502 is displayed. As shown in 502, in the substratum level control mode, there are an "A" key for performing a chromatic color substratum level control and a "B" key for performing an achromatic substratum level control. In the color space compression, there are an "ON" key and an "OFF" key.

Figures 9, 10:
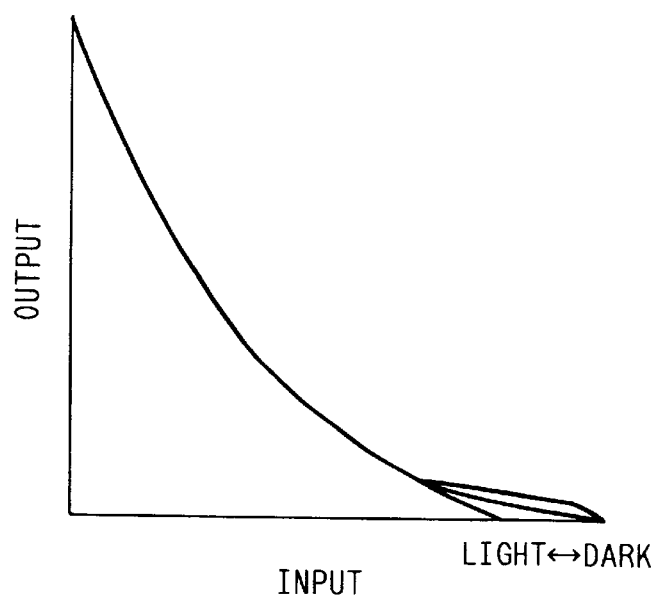
FIG. 9 is a diagram showing a combination of modes shown in the embodiment 2 of the invention.
FIG. 10 is a diagram showing an example of a light amount-density conversion that is executed in an LOG conversion unit in the image processing apparatus of the invention.

Combinations as shown in FIG. 9 can be obtained by combinations of "A" and "B" of the substratum control mode and "ON" and "OFF" of the color space compression.

Figure 5B:
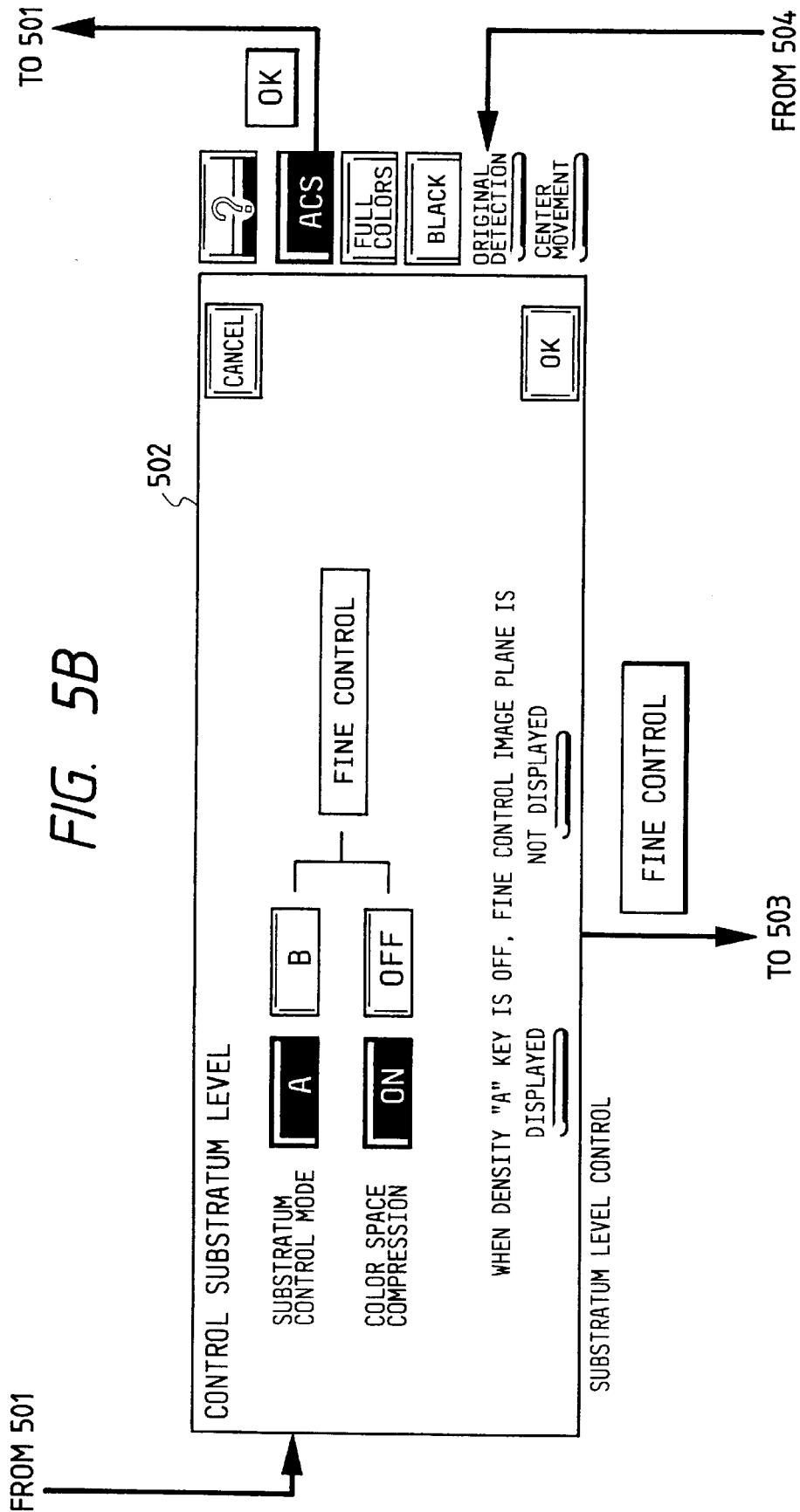
FIG. 5, comprised of FIGS. 5A to 5D, is a diagram showing an example of a console unit for the user to instruct the image processing apparatus of the invention.

As shown in 502 in FIG. 5B, when a state (i) shown in FIG. 9 is set, the substratum control mode is set to "A" and the color space compression is set to "ON". In this instance, by touching a "fine control" key, a window 503 is displayed and a standard state when the chromatic color substratum level control is performed can be independently set for each of R, G, B, and Y. Further, by touching a "color space compression" key or "OK" key in the window 503, the display is switched to a window of 504 and a degree of the color space compression can be independently set for each of R, G, and B. Further, by touching a "substratum level" key in the window 504, the display is returned to the window 503. By touching the "OK" key, the display is returned to the window 502.

Figure 6:
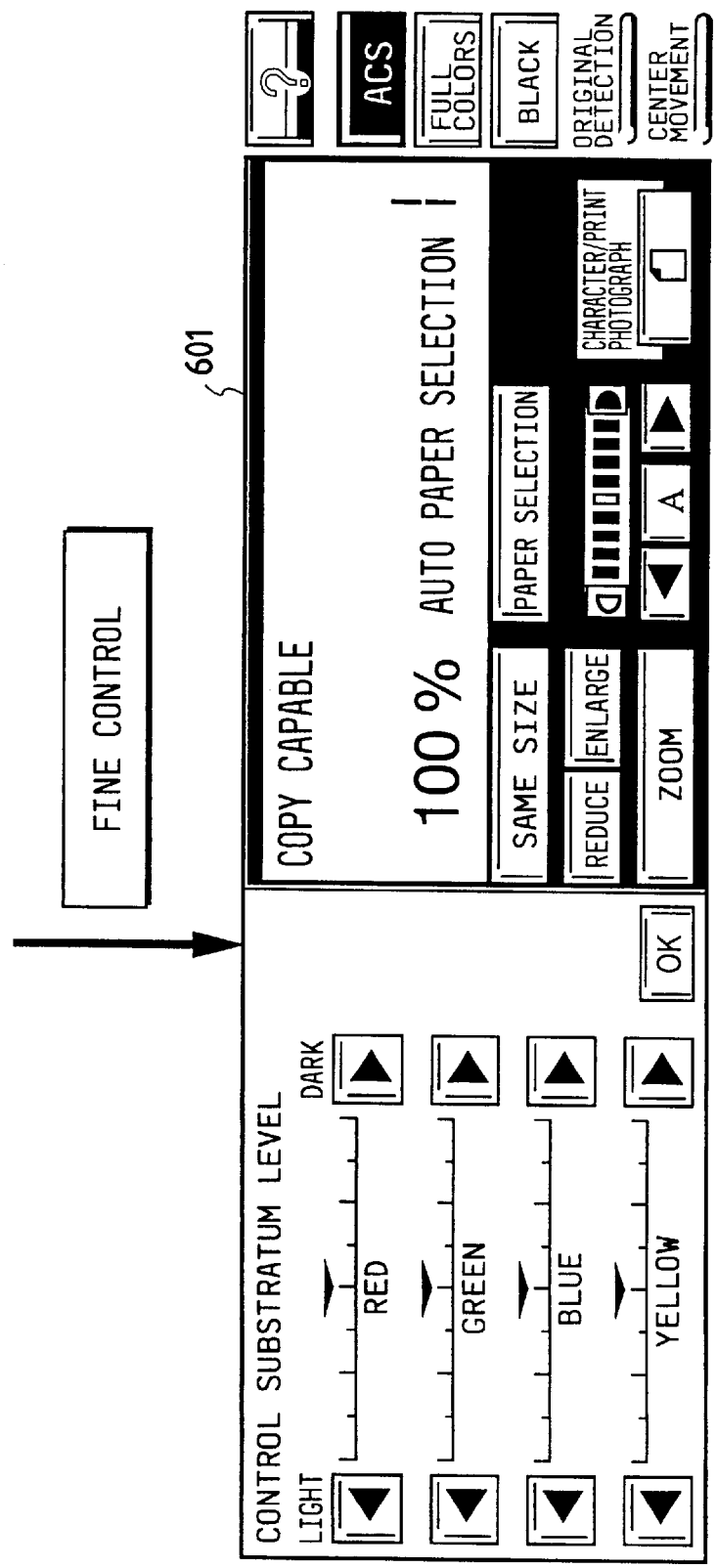
FIG. 6 is a diagram showing another example of the console unit for the user to instruct the image processing apparatus of the invention.

In the display screen of 502, a state (ii) shown in FIG. 9 is set, the substratum control mode is set to "A", and the color space compression is set to "OFF". In this instance, by touching a "fine control" key, a window of FIG. 6 is displayed. In a manner similar to the case of the state (i), a standard state when the chromatic color substratum level control is executed can be set. In this instance, the color space compression circuit 108 is set to be through and the color space compression is not executed.

Figure 7B:
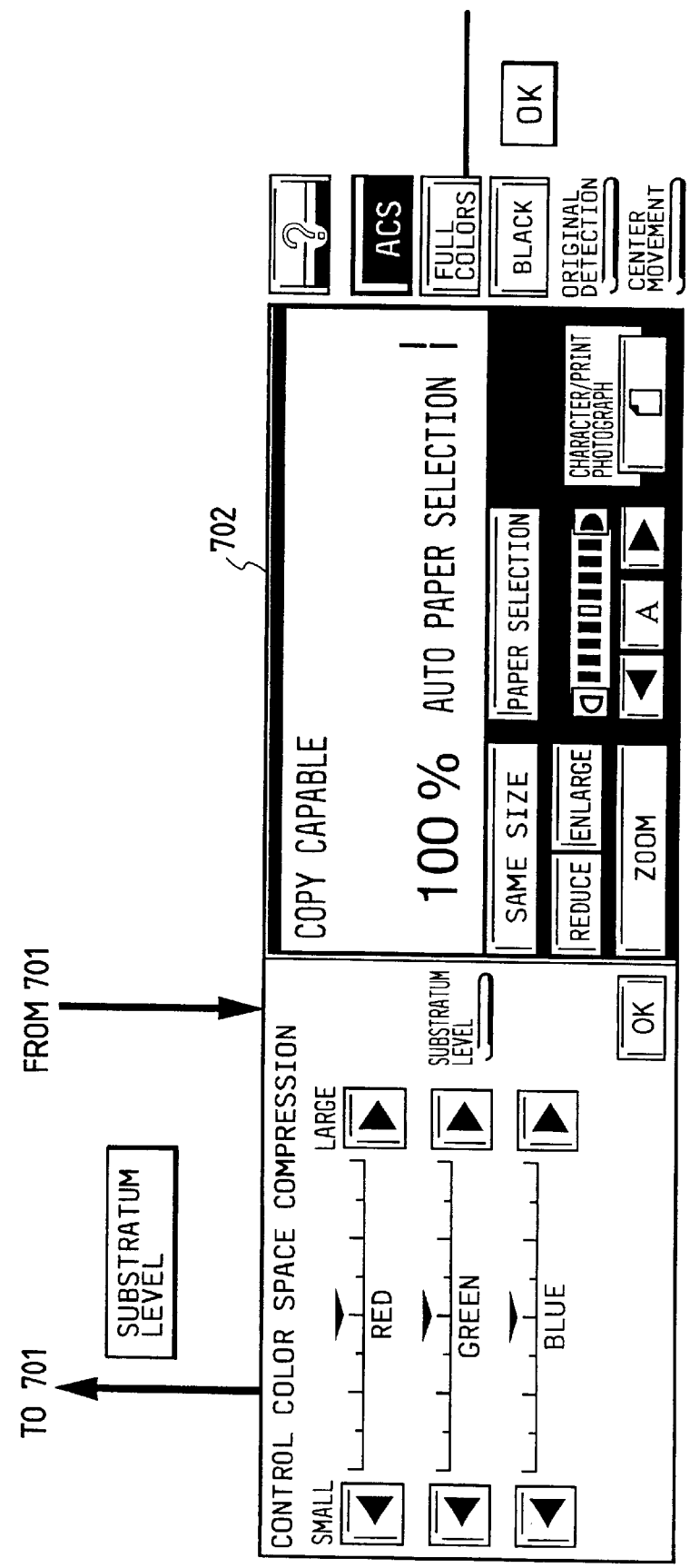
FIG. 7, comprised of FIGS. 7A and 7B, is a diagram showing another example of the console unit for the user to instruct the image processing apparatus of the invention.

In the picture plane of the window 502, a state (iii) shown in FIG. 9 is set, the substratum control mode is set to "B", and the color space compression is set to "ON". In this instance, by touching the "fine control" key, a window 701 in FIG. 7A is displayed and a standard state when the achromatic color substratum level control is performed can be set. Further, by touching a "color space compression" key in the window 701, the display is switched to a window 702.

Figure 8:
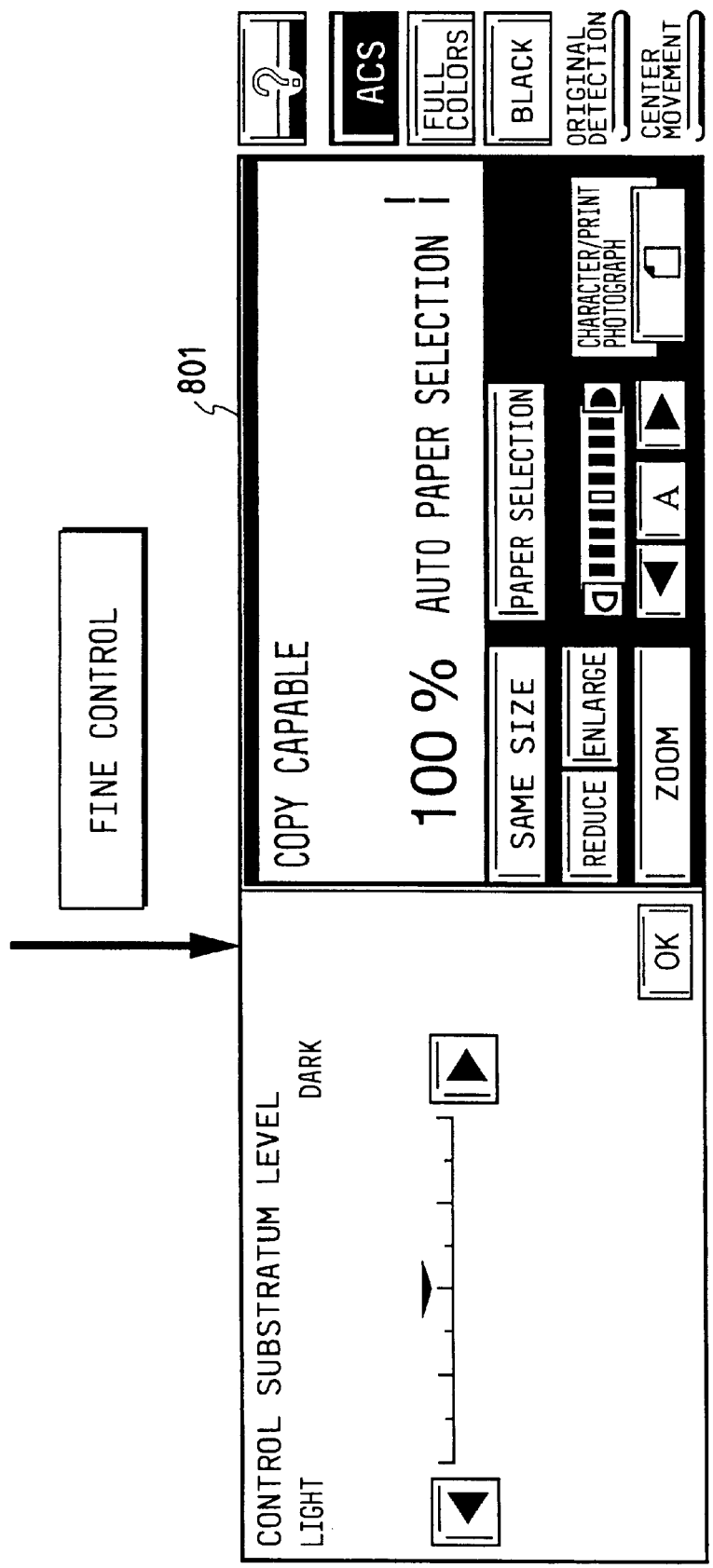
FIG. 8 is a diagram showing another example of the console unit for the user to instruct the image processing apparatus of the invention.

In the picture plane of 502, a state (iv) shown in FIG. 9 is set, the substratum control mode is set to "B", and the color space compression is set to "OFF". By touching the "fine control" key, a window as shown in FIG. 8 is displayed.

Figure 5C:
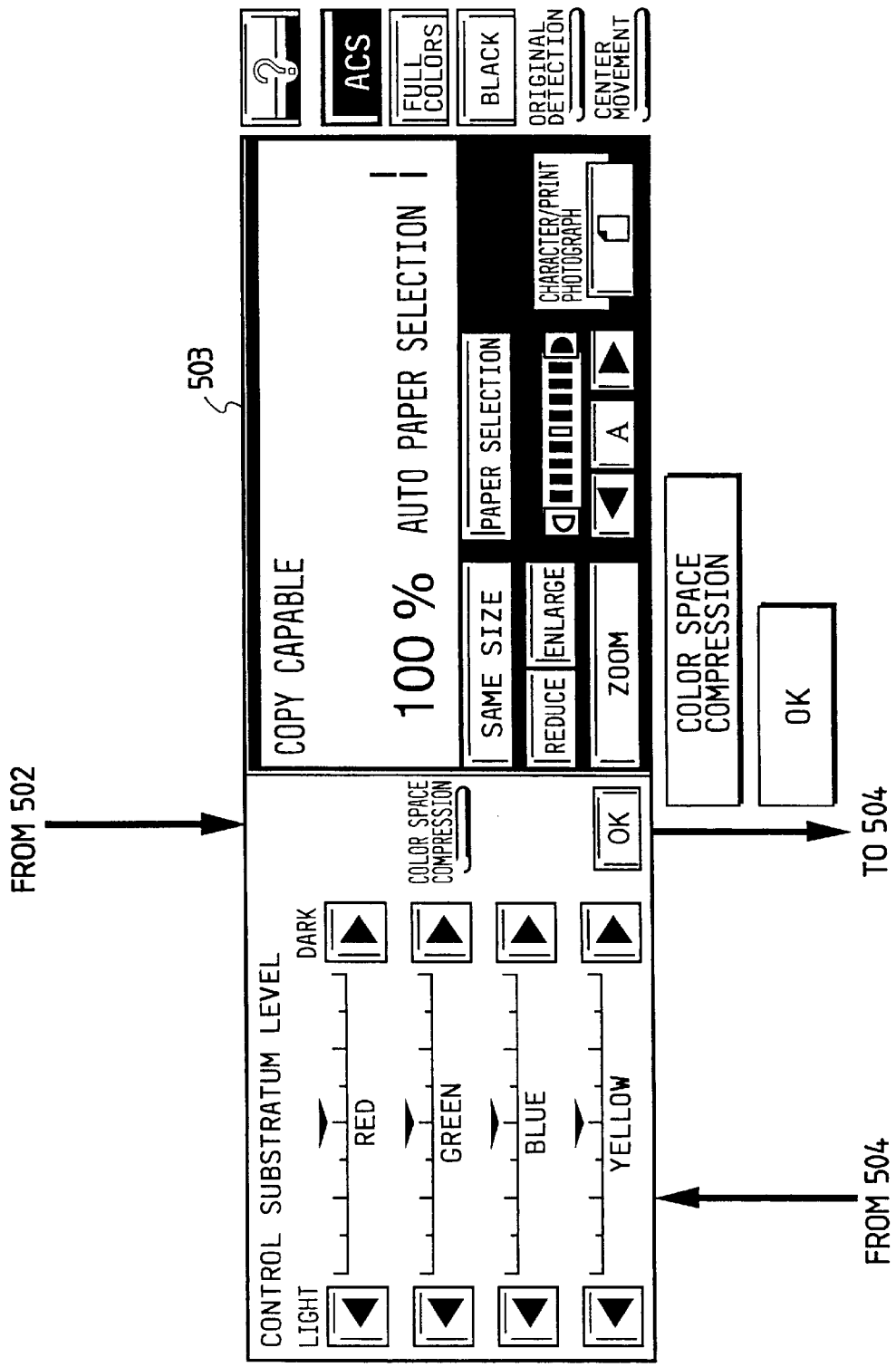
Figure 5D:
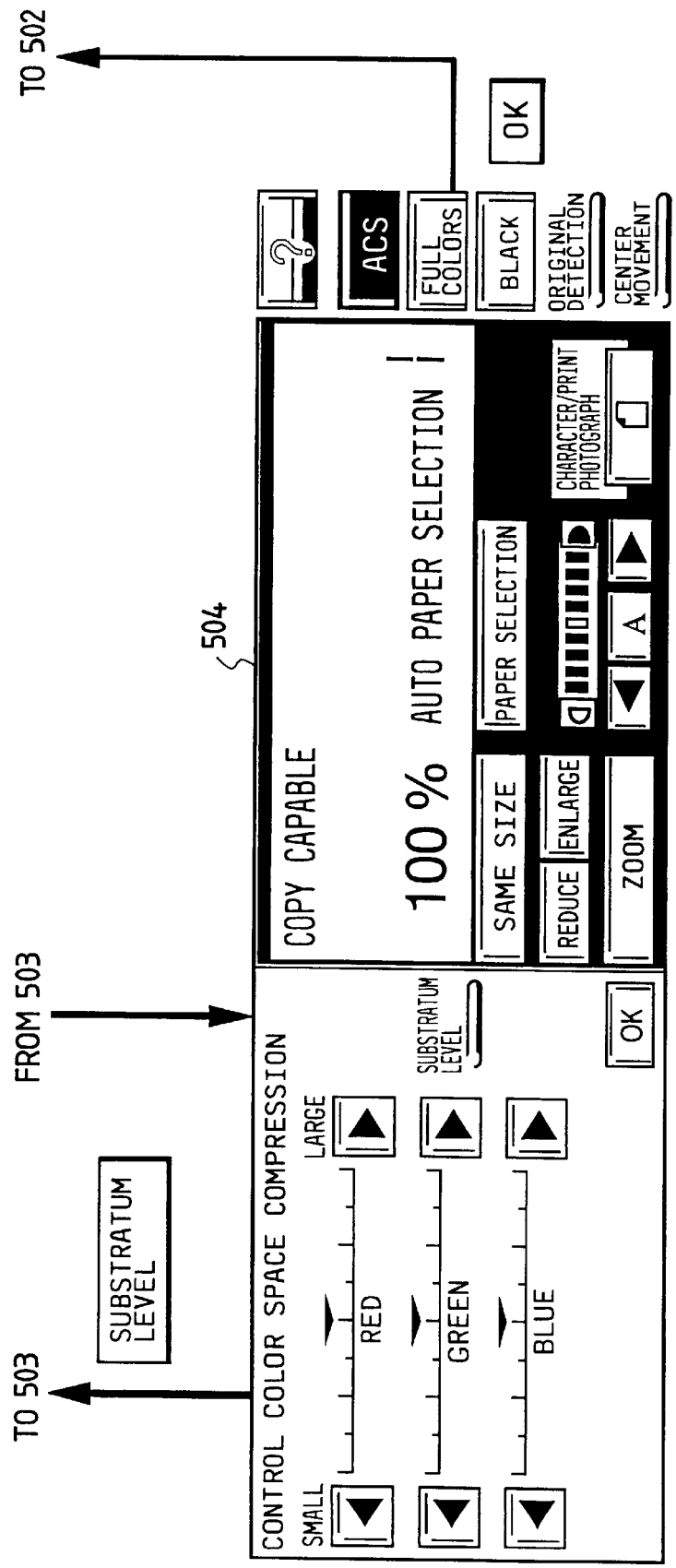

Namely, when the substratum control mode is set to "A", as shown in the window 503 in FIG. 5C or FIG. 6, a density can be controlled in a range from "dark" to "light" for each of the colors of R, G, B, and Y. Y is included as a parameter because substratums of many originals are yellowish.

Now, "dark" means that the substratum is densely displayed, while "light" denotes that the substratum is not so displayed. This means that substratum levels Rw, Gw, and Bw are set for the controls of R, G, and B and on the basis of those values, the matrix coefficients of the matrix arithmetic operation (1) in the foregoing embodiment are calculated. As the "light" side is selected, the substratum levels Rw, Gw, and Bw are set to large values. Further, since yellow is a mixed color of red and green, when controlling yellow, the set values of the substratum levels Rw and Gw are interlockingly controlled. When the substratum control mode is set to "B", the density can be controlled in a range from "dark" to "light" as shown in 701. At this time, as shown in FIG. 10, the values of the lookup table (LUT) of the LOG conversion unit 109 are changed or a plurality of preset LUTs are switched, thereby controlling the substratums.

When the color space compression is set to "ON", as shown in 504, the magnitude of the color space compression can be set with respect to each color of red, green, and blue. As the magnitude of the color space compression approaches "large", the color space compression effect is large. In this instance, in accordance with each control of red, green, and blue, the values of the color distributions $$(RGB)R, (RGB)G, (RGB)B, (RGB)C, (RGB)M, (RGB)Y=(RGB)L$$

where, $$L=1 \text{ to } 6$$

are set. On the basis of those values, the matrix coefficients of the matrix arithmetic operation (1) are calculated. As the magnitude of the color space compression approaches "large", the value of the color distribution (RGB)L can be largely set.

In step 503, an "A" key is used for auto density control (AE). Each time the "A" is touched, the image display is black/white inverted and the ON/OFF of the auto density control is set. When the AE mode is ON, the density control such as substratum control or the like is automatically performed in accordance with "A" or "B" of the substratum control mode set in 502. In this instance, when the color space compression key is "ON", the color space compression is also automatically performed. When the auto density control key "A" is OFF, the substratum level control or color space compression is executed by using the value set in FIG. 8 from the window 503.

Therefore, the user can select from the four kinds of combinations (i) to (iv) of the processes shown in FIG. 9 in accordance with the original or a desired output image and can finely control in each mode. The output image can be made closer to the original or a desired output image by the user.

For example, when the user wants to reconstruct a color tone in the color reconstructing range in accordance with the original at a high fidelity without being aware of the color tone of the portion out of the color reconstructing range, it is sufficient to set the color space compression mode to "OFF".

In the substratum control mode "A", namely, in the chromatic color substratum level control mode, it is also possible to finely control with respect to a specific color such as Y or the like in addition to the colors based on the signal format of R, G, and B or the like. Therefore, the user can easily perform the substratum level control of yellow and chromatic color in the substratum or the like of, for example, a yellowish original or the like without needing a special knowledge about the specific color.

Further, since guidance messages indicative of input procedures are displayed as shown in FIGS. 5A to 8 with respect to the selection of the combination of the processes and the fine control in each mode, the user can easily set.

Further, after the copy was executed in the ON state of the auto density control, a value that is closest to each parameter of the automatically controlled substratum control level and color space compression can be also displayed from the console unit. In this instance, on the basis of the automatically set values, the user can further finely control the substratum level and color space compression. Moreover, by storing such values of the substratum control level and color space compression into the memory, they can be also called as necessary.

Those values can be also set by not only the console unit but also an external control apparatus or the like. Those values can be also directly set by numerical values.

As mentioned above, the substratum level correction, color space compression, and the like can be also manually set.

<Embodiment 3>

The third embodiment of the invention will now be described in detail hereinbelow with reference to the drawings.

Figure 11:
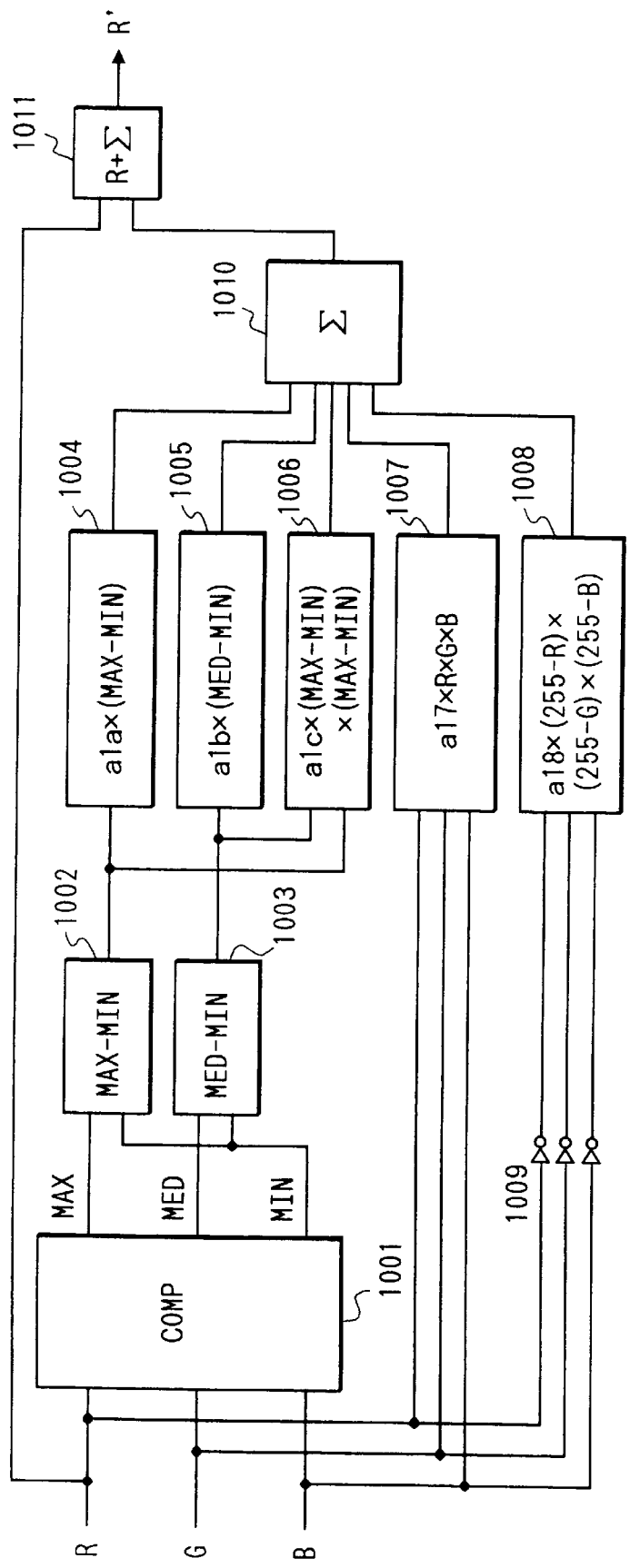
FIG. 11 is a block diagram showing another embodiment of the color space compression circuit described in the embodiment 1 of the invention.

In the first embodiment, the foregoing color space compression circuit 108 has executed the multiplication with the image signal for all of the matrix coefficients as shown in FIG. 3 when executing the matrix arithmetic operation (1) as shown in FIG. 3. One of the outputs of the subtracting circuits 302, 303, and 304 in FIG. 3 is certainly set to 0. Therefore, one of the outputs of the multiplying circuits 305, 306, and 307 is certainly set to 0. Two of the outputs of the multiplying circuits 308, 309, and 310 are certainly set to 0. Thus, the multiplying circuits can be simplified. FIG. 11 shows a detailed diagram of the circuit for arithmetically operating the R' output in the color space compression circuit 108 in the embodiment. Reference numeral 1001 denotes a comparator for outputting a maximum value MAX, a medium value MED, and a minimum value MIN for the three input signals R, G, and B. Reference numerals 1002 and 1003 denote subtracting circuits for executing arithmetic operations of (MAX−MIN) and (MED−MIN) and 1004 to 1008 indicate multiplying circuits. The multiplying circuit 1004 performs a multiplication of [a1a× (MAX−MIN)]. The multiplying circuit 1005 executes a multiplication of [a1b×(MED−MIN)]. The multiplying circuit 1006 executes a multiplication of [a1c×(MAX−MIN)× (MED−MIN)]. "a1a" and "a1b" denote coefficients corresponding to the terms of the maximum value MAX and medium value MED of the R, G, and B signals among the matrix coefficients "a11, a12, a13" of the matrix arithmetic operation (1). "a1c" denotes a coefficient corresponding to the multiplication term of the maximum value MAX and medium value MED of the R, G, and B signals among matrix coefficients "a14, a15, a16". Signal of [a17×R×G×B] are inputted to the multiplying circuit 1007. The signals inverted by NOT gates 1009 are inputted to the multiplying circuit 1008 and an arithmetic operation of [a18×(255−R)× (255−G)×(255−B)] is executed.

The signals multiplied as mentioned above are respectively added by an adding circuit 1010, respectively. The R signal is further added to an addition signal of the adding circuit 1010 by an adding circuit 1011, so that the resultant signal is outputted as an R' signal. The other G' and B' signals are also produced in a manner similar to the foregoing R' signal.

As mentioned above, since the multiplying circuits are simplified in the embodiment, the costs of the hardware circuits can be further reduced.

The invention is not limited to the signal formats of RGB or CMY but can be also applied to another format such as L*a*b*, YIQ, or the like.

The present invention can be also applied to a system constructed by a plurality of equipment or an apparatus comprising one equipment.

Although the invention has been embodied by the circuits as shown in the embodiments, it can be also embodied by a software.

It will be obviously understood that the invention can be also applied to the case where it is accomplished by supplying a program to a system or an apparatus.

The invention can be also applied to a head of the type for emitting an ink jet by causing a film boiling by a heat energy and an image processing apparatus to which a recording method using such a head is applied.

Although the present invention has been described with respect to the preferred embodiments, the invention is not limited to the foregoing embodiments but many modifications and variations are possible within the spirit and scope of the appended claims of the invention.

What is claimed is:

1. An image processing apparatus comprising:

input means for inputting image data which indicates an input color by a plurality of different color components, image data of a plurality of signal formats being inputable by said input means and kind of the plurality of color components being different in each of the plurality of signal formats;

setting means for setting a color space compression processing mode on a basis of a kind of signal format of the inputted image data; and color space compression processing means for performing a color space compressing process to the inputted image data on a basis of the set color space compression processing mode, wherein the color space compression processing mode includes a first mode in which the color space compression is performed and a second mode in which the color space compression is not performed.

2. An apparatus according to claim 1, wherein in a case where the signal format is a CMYK format, the second mode is set.

3. An apparatus according to claim 1, wherein a case where the signal format is a RGB format, the first mode is set.

4. An apparatus according to claim 1, wherein said color space compression processing means executes a matrix arithmetic operation.

5. An apparatus according to claim 1, wherein in the second mode, said color space compression processing means is set to process the inputted image data by throughputting the image data without change.

6. An apparatus according to claim 1, wherein said color space compression processing means is bypassed in the second mode.

7. An apparatus according to claim 1, further comprising judging means for judging the kind of signal format of the inputted image data.

8. An apparatus according to claim 1, further comprising:

a scanner unit for scanning an original to produce the inputted image data; and an image forming unit for forming a color image on a recording medium, on the basis of color-gamut-mapped image data.

9. An image processing apparatus comprising:

first input means for scanning an original image and generating a first image signal representing said original image;

second input means for inputting a second image signal representing an input image from an external apparatus; and image forming means for forming an image on a recording medium in accordance with the image signal from said first or second input means, wherein said apparatus further includes color space compressing means for executing a color space compressing process on the first image signal inputted by said first input means and outputting the processed image signal and for outputting the second image signal inputted by said second input means without performing a color space compression on the second signal.

10. An apparatus according to claim 9, wherein said external apparatus is an external memory apparatus.

11. An apparatus according to claim 9, wherein said external apparatus is a film scanner.

12. An image processing method comprising:

an input step of inputting image data which indicates an input color by a plurality of different color components, image data of a plurality of signal formats being inputable by said input means and kind of the plurality of color components being different in each of the plurality of signal formats;

a setting step of setting a color space compression processing mode on a basis of a kind of signal format of the inputted image data; and a color space compression processing step of executing a color space compressing process on the inputted image data on a basis of the set color space compression processing mode, wherein the color space compression processing mode includes a first mode in which the color space compression is performed and a second mode in which the color space compression is not performed.

13. An image processing method comprising:

a first input step of scanning an original image and generating a first image signal representing said original image;

a second input step of inputting a second image signal representing an input image from an external apparatus; and an image forming step of forming an image on a recording medium in accordance with the image signal produced by said first or second input step, wherein said method further includes a color space compressing step of performing a color space compressing process to the first image signal inputted in said first input step and outputting the processes image signal and outputting the second image signal inputted in said second input step without performing the color space compression on the second image signal.

* * * * *

UNITED STATES PATENT AND TRADEMARK OFFICE
CERTIFICATE OF CORRECTION

PATENT NO. : 6,259,811 B1
DATED : July 10, 2001
INVENTOR(S) : Hiroyuki Tsuji

It is certified that error appears in the above-identified patent and that said Letters Patent is hereby corrected as shown below:

<u>Title page,</u>
Item [56], References Cited, U.S. PATENT DOCUMENTS, insert:

|  |  |  |
|---|---|---|
| -- 2,981,792 | 4/1961 | Farber ………. 178/5.2 |
| 4,402,007 | 8/1983 | Yamada …….. 358/75 |
| 4,979,032 | 12/1990 | Alessi et al. ….. 358/76 |
| 4,837,450 * | 6/1989 | Satomura ……. 358/487 |
| 4,931,860 * | 6/1990 | Narumiya ……. 358/515 |
| 5,081,527 * | 1/1992 | Naito ………… 358/518 --; and |

FOREIGN PATENT DOCUMENTS, insert:

|  |  |  |
|---|---|---|
| -- 2133657 | 7/1984 (UK) …………. H04N/1/46 |
| 0142975 | 5/1985 (EPO) ………... H04N/1/46 |
| 0488655 | 6/1992 (EPO) ………... H04N/1/46 |
| 2455306 | 11/1980 (Fr) …………. G03F/3/00 --. |

<u>Column 1,</u>
Line 26, "it" (second occurrence) should be deleted.

<u>Column 4,</u>
Line 1, "Afte r" should read -- After --; and
Line 26, "is" should read -- are --.

<u>Column 5,</u>
Line 67, "be also" should read -- also be --.

<u>Column 6,</u>
Line 23, "be" should read -- also --;
Line 24, "also" should read -- be --; and
Lines 26 and 64, "be also" should read -- also be --.

<u>Column 7,</u>
Line 34, "the 25" should read -- the --.

UNITED STATES PATENT AND TRADEMARK OFFICE
CERTIFICATE OF CORRECTION

PATENT NO. : 6,259,811 B1
DATED : July 10, 2001
INVENTOR(S) : Hiroyuki Tsuji

It is certified that error appears in the above-identified patent and that said Letters Patent is hereby corrected as shown below:

Column 10,
Lines 15, 18 and 21 "be also" should read -- also be --.

Column 13,
Line 26, "be also" should read -- also be --; and
Lines 46 and 50, "are" should read -- is --.

Column 14,
Line 67, "theauto" should read -- the auto --.

Column 15,
Lines 38, 43, 45, 47 and 49, "be also" should read -- also be --.

Column 16,
Lines 32, 34, 38 and 43, "be also" should read -- also be --;
Line 40, "be" should read -- also --; and
Line 41, "also" should read -- be --.

Column 17,
Line 14, "wherein" should read -- wherein, --.

Signed and Sealed this

Twelfth Day of August, 2003

JAMES E. ROGAN
*Director of the United States Patent and Trademark Office*